United States Patent
Kawano et al.

(10) Patent No.: US 12,218,592 B2
(45) Date of Patent: Feb. 4, 2025

(54) CONTROL CIRCUIT FOR DC/DC CONVERTER

(71) Applicant: ROHM CO., LTD., Kyoto (JP)

(72) Inventors: Akihiro Kawano, Kyoto (JP); Hiroaki Ando, Kyoto (JP)

(73) Assignee: ROHM CO., LTD, Kyoto (JP)

( * ) Notice: Subject to any disclaimer, the term of this patent is extended or adjusted under 35 U.S.C. 154(b) by 324 days.

(21) Appl. No.: 17/896,140

(22) Filed: Aug. 26, 2022

(65) Prior Publication Data

US 2022/0407421 A1  Dec. 22, 2022

Related U.S. Application Data

(63) Continuation of application No. PCT/JP2021/006790, filed on Feb. 24, 2021.

(30) Foreign Application Priority Data

Feb. 28, 2020  (JP) .................................. 2020-034054
Mar. 12, 2020  (JP) .................................. 2020-043157

(51) Int. Cl.
*H02M 3/158*  (2006.01)
*H02M 3/157*  (2006.01)
*H02M 1/32*  (2007.01)

(52) U.S. Cl.
CPC ........... *H02M 3/158* (2013.01); *H02M 3/157* (2013.01); *H02M 1/32* (2013.01)

(58) Field of Classification Search
CPC .......... H02M 3/158; H02M 3/157; H02M 1/32
See application file for complete search history.

(56) References Cited

U.S. PATENT DOCUMENTS 10,587,196 B1 *  3/2020  Ho .......................... H02M 1/08
11,095,221 B1 *  8/2021  Hsu ....................... H02M 3/158
(Continued)

FOREIGN PATENT DOCUMENTS

JP  2017169259 A  9/2017
JP  2018110530 A  7/2018

OTHER PUBLICATIONS

PCT International Preliminary Report of Patentability with Written Opinion for corresponding International Application No. PCT/JP2021/006790; Issued on Aug. 30, 2022.
(Continued)

*Primary Examiner* — Jue Zhang
*Assistant Examiner* — Lakaisha Jackson
(74) *Attorney, Agent, or Firm* — CANTOR COLBURN LLP

(57) ABSTRACT

A main comparator compares a feedback voltage $V_{FB}$ corresponding to an output voltage $V_{OUT}$ of a DC/DC converter with a reference voltage $V_{REF}$ and asserts a turn-on signal when the feedback voltage $V_{FB}$ falls below the reference voltage $V_{REF}$. A timer circuit generates a turn-off signal S2 that transitions in level after an ON time $T_{ON}$ proportional to $(V_{OUT}-V_{IN})/V_{OUT}$ has elapsed from assertion of the turn-on signal.

17 Claims, 20 Drawing Sheets

(56) References Cited

U.S. PATENT DOCUMENTS

2014/0084885 A1* 3/2014 Ouyang ............... H02M 3/158
                                                  323/271
2017/0126129 A1   5/2017 Li
2022/0190722 A1* 6/2022 Zhang ................ H02M 1/0032

OTHER PUBLICATIONS

International Search Report for International Application No. PCT/JP2021/006790; Mailing Date May 11, 2021.
JPO Notification of Reason(s) for Refusal for corresponding JP Patent Application No. 2022-503634; Issued Oct. 8, 2024.

* cited by examiner

CONTROL CIRCUIT FOR DC/DC CONVERTER

CROSS REFERENCE TO RELATED APPLICATIONS

This application is a continuation under 35 U.S.C. § 120 of PCT/JP2021/006790, filed Feb. 24, 2021, which is incorporated herein by reference, and which claimed priority to Japanese Application No. 2020-034054, filed Feb. 28, 2020, and Japanese Application No. 2020-043157, filed Mar. 12, 2020. The present application likewise claims priority under 35 U.S.C. § 119 to Japanese Application No. 2020-034054, filed Feb. 28, 2020, and Japanese Application No. 2020-043157, filed Mar. 12, 2020, the entire content both of which are also incorporated herein by reference.

BACKGROUND

1. Technical Field

The present disclosure relates to a DC/DC converter.

2. Description of the Related Art

A DC/DC converter is used when a DC (direct current) voltage of a certain voltage value is converted into a DC voltage of another voltage value. As a control method of the DC/DC converter, a ripple control method is known. The ripple control method is a method in which an output voltage of the DC/DC converter is compared with a threshold voltage, and when the output voltage exceeds (or falls below) the threshold voltage, the switching transistor is switched on and off with the output voltage as a trigger. The ripple control method has an advantage that a response speed is high and power consumption can be reduced as compared with a voltage mode control method or an electric current mode control method using an error amplifier.

The present inventors have studied application of ripple control of bottom detection and constant on time (COT) to a boost converter.

This method is easy to design because phase compensation is unnecessary and has a feature of excellent high-speed transient response. On the other hand, when the ON time is fixed, there is a problem that switching frequency greatly fluctuates.

SUMMARY OF THE INVENTION

One embodiment of the present disclosure has been made in view of the related problems, and an exemplary general purpose of one embodiment is to provide a control circuit of a boost DC/DC converter in which the switching frequency can be stabilized.

Another exemplary general purpose of one embodiment of the present disclosure is to provide a DC/DC converter and a control circuit thereof capable of reducing an output voltage in an overcurrent state.

1. One embodiment of the present disclosure relates to a control circuit of a DC/DC converter that boosts an input voltage $V_{IN}$ and generates an output voltage $V_{OUT}$. The control circuit includes a main comparator structured to compare a feedback voltage corresponding to an output voltage of the DC/DC converter with a reference voltage and to asserts a turn-on signal when the feedback voltage falls below the reference voltage, and a timer circuit structured to generate a turn-off signal transitioning in level after an on time proportional to $(V_{OUT}-V_{IN})/V_{OUT}$ has elapsed from the assertion of the turn-on signal.

2. One embodiment of the present disclosure relates to a control circuit of a DC/DC converter including a switching transistor. The control circuit includes a main comparator structured to compare a feedback voltage corresponding to an output voltage of a DC/DC converter with a reference voltage, and to assert a turn-on signal when the feedback voltage falls below the reference voltage; an ON time generation circuit structured to assert a turn-off signal after a lapse of an ON time from turn-on of a switching transistor; an overcurrent detection circuit structured to assert an overcurrent detection signal when a current flowing through the switching transistor exceeds an overcurrent threshold in an ON period of the switching transistor; a turn-on inhibition circuit structured to generate a turn-on inhibition signal to be asserted in a period from turn-on of the switching transistor until a lapse of a predetermined time; a logic circuit structured to generate a pulse signal that transitions to an ON level when the turn-on signal is asserted in a period in which the turn-on inhibition signal is negated, and transitions to an OFF level when the turn-off signal or the overcurrent detection signal is asserted; and a driver structured to drive the switching transistor according to the pulse signal.

It is to be noted that any arbitrary combination or rearrangement of the above-described structural components and so forth is effective as and encompassed by the present embodiments. Moreover, this summary does not necessarily describe all necessary features so that the disclosure may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Figure 1:
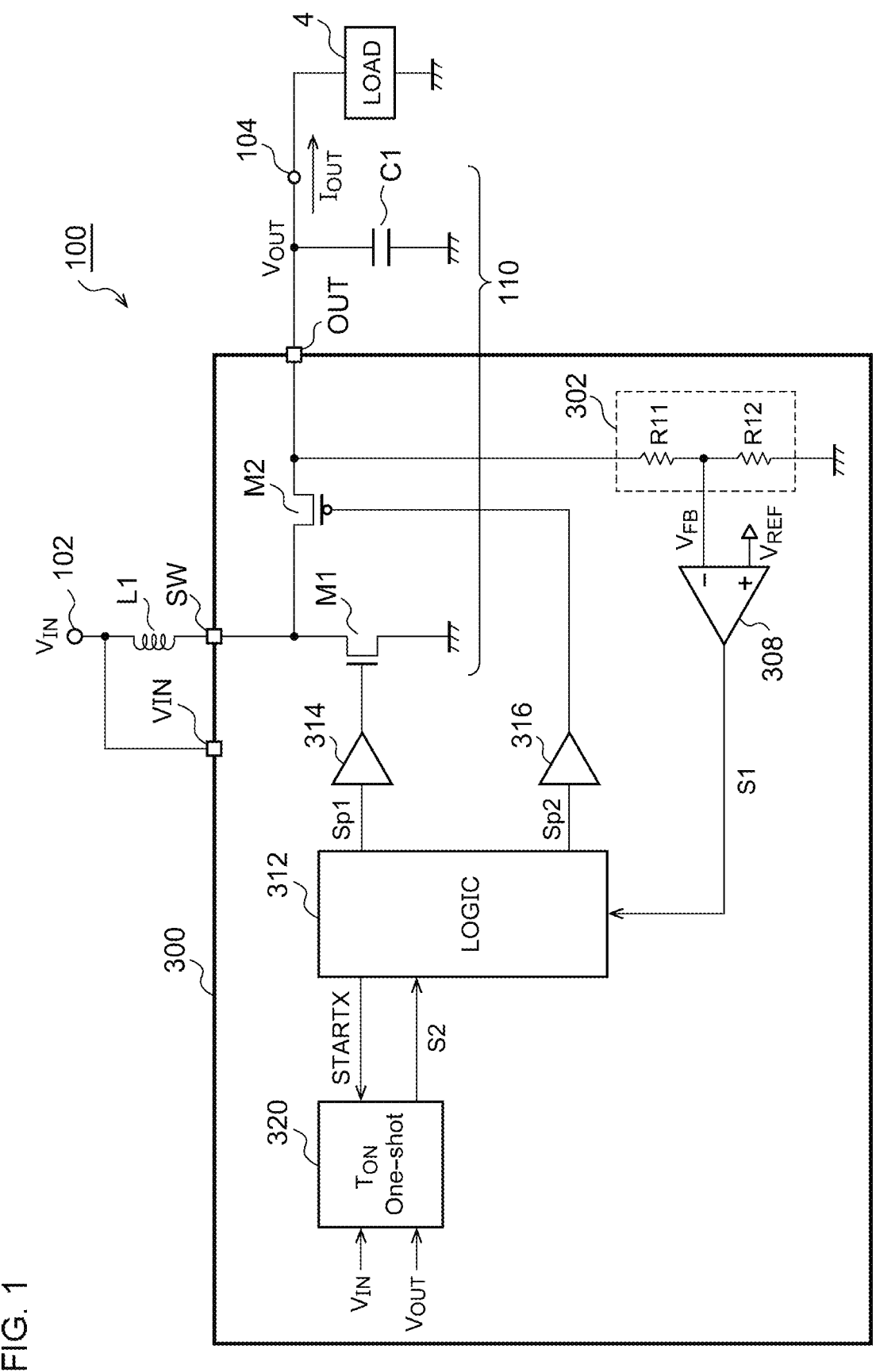
FIG. 1 is a circuit diagram of a DC/DC converter according to the first embodiment.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

1. One embodiment disclosed in the present description relates to a control circuit for a DC/DC converter that boosts an input voltage $V_{IN}$ and generates an output voltage $V_{OUT}$. The control circuit includes a main comparator that compares a feedback voltage corresponding to an output voltage of the DC/DC converter with a reference voltage and asserts a turn-on signal when the feedback voltage falls below the reference voltage, and a timer circuit that generates a turn-off signal transitioning in level after an on time proportional to $(V_{OUT}-V_{IN})/V_{OUT}$ has elapsed from the assertion of the turn-on signal.

According to this embodiment, a switching frequency can be stabilized by adaptively changing the ON time according to the input voltage and the output voltage.

The timer circuit may include a first capacitor, a current source that is connected to the first capacitor and generates a current proportional to $V_{OUT}$, and a comparator that detects that a voltage change proportional to $(V_{OUT}-V_{IN})$ occurs in the first capacitor.

The current generated by the current source is $I=\alpha \times V_{OUT}$. Time $T_{ON}$ required for the voltage change $\Delta V=\beta \times (V_{OUT}-V_{IN})$ proportional to $(V_{OUT}-V_{IN})$ to occur in the first capacitor is expressed as $$T_{ON}=\Delta V/I=\beta \times (V_{OUT}-V_{IN})/(\alpha \times V_{OUT})=(\beta/\alpha) \times (V_{OUT}-V_{IN})/V_{OUT},$$

and the ON time proportional to $(V_{OUT}-V_{IN})/V_{OUT}$ can be generated.

One end of the first capacitor may be grounded. The timer circuit may further include a threshold voltage generation circuit that generates a threshold voltage according to $(V_{OUT}-V_{IN})$. The comparator may compare a voltage at the other end of the first capacitor with the threshold voltage.

The threshold voltage generation circuit may include a second capacitor. The threshold voltage generation circuit may charge the second capacitor with $(V_{OUT}-V_{IN})$ in the OFF state of the switching transistor, apply the switching voltage of a connection node between the inductor and the switching transistor to one end of the second capacitor in an ON period of the switching transistor, and set the voltage at the other end of the second capacitor as the threshold voltage. The switching voltage during the ON period is $I \times R_{ON1}$. I is a current flowing through the switching transistor, and $R_{ON1}$ is an ON resistance of the switching transistor. Therefore, according to this configuration, it is possible to generate the ON time in consideration of the ON resistance of the switching transistor.

The threshold voltage generation circuit may include a second capacitor, a first selector that applies an input voltage $V_{IN}$ to one end of the second capacitor in the OFF state of the switching transistor and connects the one end of the second capacitor with the inductor of the DC/DC converter and the connection node of the switching transistor during an ON period of the switching transistor, and a second selector that applies an output voltage $V_{OUT}$ to the other end of the second capacitor in the OFF state of the switching transistor and connects the other end of the second capacitor with the comparator during the ON period of the switching transistor. According to this configuration, it is possible to generate the ON time in consideration of the ON resistance of the switching transistor.

The threshold voltage generation circuit may include an inverter that inverts a switching voltage generated at an inductor of the DC/DC converter and a connection node of the switching transistor, and a filter that smooths an output of the inverter and generates a threshold voltage. According to this configuration, the ON time can be generated in consideration of the influence of the ON resistances of the switching transistor and the synchronous rectification transistor as well as the equivalent series resistance of the inductor.

The filter may be an RC filter. The threshold voltage generation circuit may charge the capacitor of the RC filter with $V_{OUT}-V_{IN}$ while operating in the discontinuous current mode. According to this configuration, when returning from the discontinuous current mode to the continuous current mode, the operation can be resumed from an appropriate ON time.

The filter may be an RC filter including a resistor and a capacitor. The threshold voltage generation circuit may further include a third selector that applies an output voltage of the inverter to one end of the resistor during the continuous current mode and applies the output voltage $V_{OUT}$ to one end of the resistor during the discontinuous current mode, and a fourth selector that applies a ground voltage to the other end of the capacitor during the continuous current mode and applies the input voltage $V_{IN}$ to the other end of the capacitor during the discontinuous current mode. According to this configuration, when returning from the discontinuous current mode to the continuous current mode, the operation can be resumed from an appropriate ON time.

The input voltage $V_{IN}$ may be applied to one end of the first capacitor. The comparator may compare the voltage at the other end of the first capacitor with the output voltage $V_{OUT}$. Since the ON resistance of the transistor and the equivalent series resistance of the inductor are ignored, the ON time can be generated with a simple configuration although the frequency at a heavy load becomes faster.

The control circuit may be integrally integrated on one semiconductor substrate. The term "integrally integrated"

includes a case where all components of a circuit are formed on a semiconductor substrate and a case where main components of the circuit are integrally integrated, and some resistors, capacitors, and the like may be provided outside the semiconductor substrate for adjusting a circuit constant. By integrating the circuits on one chip, a circuit area can be reduced, and the characteristics of circuit elements can be kept uniform.

2. One embodiment disclosed in the present description relates to a control circuit for a DC/DC converter including a switching transistor. A control circuit includes a main comparator that compares a feedback voltage corresponding to an output voltage of a DC/DC converter with a reference voltage, and asserts a turn-on signal when the feedback voltage falls below the reference voltage; an ON time generation circuit that asserts a turn-off signal after a lapse of an ON time from the assertion of the turn-on signal; an overcurrent detection circuit that asserts an overcurrent detection signal when a current flowing through a switching transistor exceeds an overcurrent threshold in an ON period of the switching transistor; a turn-on inhibition circuit that generates a turn-on inhibition signal to be asserted in a period from the turn-on of the switching transistor to the lapse of a predetermined time; a logic circuit that generates a pulse signal that transitions to an on-level when the turn-on signal is asserted in a period in which the turn-on inhibition signal is negated, and transitions to an OFF level when the turn-off signal or the overcurrent detection signal is asserted; and a driver that drives the switching transistor according to the pulse signal.

According to this embodiment, the output voltage can be lowered in the overcurrent state.

The DC/DC converter may be a boost type that boosts the input voltage $V_{IN}$ and generates an output voltage $V_{OUT}$.

The ON time may be proportional to $(V_{OUT}-V_{IN})/V_{OUT}$. A switching frequency can be stabilized by adaptively changing the ON time according to the input voltage and the output voltage.

The ON time generation circuit may include a first capacitor, a current source that is connected to the first capacitor and generates a current proportional to $V_{OUT}$, and a comparator that detects that a voltage change proportional to $(V_{OUT}-V_{IN})$ occurs in the first capacitor.

The current generated by the current source is $I=\alpha \times V_{OUT}$. The time $T_{ON}$ required for the voltage change $\Delta V = \beta \times (V_{OUT}-V_{IN})$ proportional to $(V_{OUT}-V_{IN})$ to occur in the first capacitor is expressed as $$T_{ON} = \Delta V/I = \beta \times (V_{OUT} - V_{IN})/(\alpha \times V_{OUT})$$
$$= (\beta/\alpha) \times (V_{OUT} - V_{IN})/V_{OUT},$$

and the ON time proportional to $(V_{OUT}-V_{IN})/V_{OUT}$ can be generated.

One end of the first capacitor may be grounded. The ON time generation circuit may further include a threshold voltage generation circuit that generates a threshold voltage according to $(V_{OUT}-V_{IN})$. The comparator may compare a voltage at the other end of the first capacitor with the threshold voltage.

The threshold voltage generation circuit may include a second capacitor. The threshold voltage generation circuit may charge the second capacitor with $(V_{OUT}-V_{IN})$ in the OFF state of the switching transistor, apply the switching voltage of a connection node between the inductor and the switching transistor to one end of the second capacitor in an ON period of the switching transistor, and set the voltage at the other end of the second capacitor as the threshold voltage. The switching voltage during the ON period is $I \times R_{ON1}$. I is a current flowing through the switching transistor, and $R_{ON1}$ is an ON resistance of the switching transistor. Therefore, according to this configuration, it is possible to generate the ON time in consideration of the ON resistance of the switching transistor.

The threshold voltage generation circuit may include a second capacitor, a first selector that applies an input voltage $V_{IN}$ to one end of the second capacitor in the OFF state of the switching transistor and connects the one end of the second capacitor with the inductor of the DC/DC converter and the connection node of the switching transistor during an ON period of the switching transistor, and a second selector that applies an output voltage $V_{OUT}$ to the other end of the second capacitor in the OFF state of the switching transistor and connects the other end of the second capacitor with the comparator during the ON period of the switching transistor. According to this configuration, it is possible to generate the ON time in consideration of the ON resistance of the switching transistor.

The threshold voltage generation circuit may include an inverter that inverts a switching voltage generated at an inductor of the DC/DC converter and a connection node of the switching transistor, and a filter that smooths an output of the inverter and generates a threshold voltage. According to this configuration, the ON time can be generated in consideration of the influence of the ON resistances of the switching transistor and the synchronous rectification transistor as well as the equivalent series resistance of the inductor.

The filter may be an RC filter. The threshold voltage generation circuit may charge the capacitor of the RC filter with $V_{OUT}-V_{IN}$ while operating in the discontinuous current mode. According to this configuration, when returning from the discontinuous current mode to the continuous current mode, the operation can be resumed from an appropriate ON time.

The filter may be an RC filter including a resistor and a capacitor. The threshold voltage generation circuit may further include a third selector that applies an output voltage of the inverter to one end of the resistor during the continuous current mode and applies the output voltage $V_{OUT}$ to one end of the resistor during the discontinuous current mode, and a fourth selector that applies a ground voltage to the other end of the capacitor during the continuous current mode and applies the input voltage $V_{IN}$ to the other end of the capacitor during the discontinuous current mode. According to this configuration, when returning from the discontinuous current mode to the continuous current mode, the operation can be resumed from an appropriate ON time.

The input voltage $V_{IN}$ may be applied to one end of the first capacitor. The comparator may compare the voltage at the other end of the first capacitor with the output voltage $V_{OUT}$. Since the ON resistance of the transistor and the equivalent series resistance of the inductor are ignored, the ON time can be generated with a simple configuration although the frequency at a heavy load becomes faster.

The control circuit may be integrally integrated on one semiconductor substrate. The term "integrally integrated" includes a case where all components of a circuit are formed on a semiconductor substrate and a case where main components of the circuit are integrally integrated, and some resistors, capacitors, and the like may be provided outside the semiconductor substrate for adjusting a circuit constant.

By integrating the circuits on one chip, a circuit area can be reduced, and the characteristics of circuit elements can be kept uniform.

EMBODIMENTS

Hereinafter, the present disclosure will be described based on preferred embodiments with reference to the drawings. The same or equivalent components, members, and processes illustrated in the drawings are denoted by the same reference numerals, and redundant description will be omitted as appropriate. Furthermore, the embodiments are not intended to limit the invention but are examples, and all features described in the embodiments and combinations thereof are not necessarily essential to the invention.

In the present description, "a state in which a member A is connected to a member B" includes not only a case where the member A and the member B are physically and directly connected to each other, but also a case where the member A and the member B are indirectly connected to each other via another member that does not substantially affect an electrical connection state between the member A and the member B or that does not impair a function or an effect exhibited by coupling between the two members.

Similarly, "a member C is provided between the member A and the member B" includes not only a case where the member A and the member C, or the member B and the member C are directly connected to each other, but also a case where the members are indirectly connected to each other via another member that does not substantially affect an electrical connection state between the members or that does not impair a function or an effect exhibited by the connection between the members.

In addition, "a signal A (voltage, current) is corresponding to a signal B (voltage, current)" means that the signal A has a correlation with the signal B. Specifically, it means (i) when the signal A is the signal B, (ii) when the signal A is proportional to the signal B, (iii) when the signal A is obtained by level-shifting the signal B, (iv) when the signal A is obtained by amplifying the signal B, (v) when the signal A is obtained by inverting the signal B, (vi) or any combination thereof, or the like. It is understood by a person skilled in the art that a range of "corresponding to" is determined according to types and applications of the signals A and B.

A vertical axis and a horizontal axis of a waveform diagram and a time chart referred to in the present description are appropriately enlarged and reduced for easy understanding, and each waveform shown is simplified or exaggerated or emphasized for easy understanding.

First Embodiment

FIG. 1 is a circuit diagram of a DC/DC converter 100 according to the first embodiment. The DC/DC converter 100 is a boost converter, boosts an input voltage $V_{IN}$ of an input line (an input terminal) 102, stabilizes the input voltage to a predetermined voltage level, and supplies the voltage to a load 4 connected to an output line (output terminal) 104.

The DC/DC converter 100 includes an output circuit 110 and a control circuit 300. The output circuit 110 includes an inductor L1, a switching transistor (a low-side transistor) M1, a synchronous rectification transistor (a high-side transistor) M2, and an output capacitor C1.

The control circuit 300 is a controller of a ripple control method, more specifically, a bottom detection method, and includes a switching pin SW and an output pin OUT. An external inductor L1 is connected to the switching pin SW, and an external output capacitor C1 and the output line 104 are connected to the output pin OUT.

The control circuit 300 includes a voltage dividing circuit 302, a main comparator 308, a logic circuit 312, a first driver 314, a second driver 316, a timer circuit 320, a switching transistor M1, and a synchronous rectification transistor M2, and is an integrated circuit (IC) integrated on one semiconductor substrate.

The voltage dividing circuit 302 includes the resistors R11 and R12 and divides the output voltage $V_{OUT}$ to generate the feedback voltage $V_{FB}$.

The main comparator 308 compares the feedback voltage $V_{FB}$ corresponding to the output voltage $V_{OUT}$ of the DC/DC converter 100 with a reference voltage $V_{REF}$ and asserts a turn-on signal S1 when the feedback voltage $V_{FB}$ falls below the reference voltage $V_{REF}$. The turn-on signal S1 is a pulse signal indicating a magnitude relationship between $V_{FB}$ and $V_{REF}$, and one of a positive edge and a negative edge can be associated with assertion.

The logic circuit 312 generates pulse signals Sp1 and Sp2 instructing on and off of the switching transistor M1 and the synchronous rectification transistor M2 based on the turn-on signal S1.

The logic circuit 312 changes a start signal STARTX with assertion of the turn-on signal S1 as a trigger to operate the timer circuit 320. The timer circuit 320 generates a turn-off signal S2 that transitions in level after a lapse of an ON time $T_{ON}$ proportional to $(V_{OUT}-V_{IN})/V_{OUT}$ from assertion of the turn-on signal S1. The turn-off signal S2 indicates a turn-off timing of the switching transistor M1.

The first pulse signal Sp1 is at the ON level (for example, high) during the on time $T_{ON}$ from assertion of the turn-on signal S1 to assertion of the turn-off signal S2, and is at an OFF level (for example, low) until assertion of the next turn-on signal S1.

In the continuous current mode (CCM), the logic circuit 312 complementarily changes the second pulse signal Sp2 with the first pulse signal Sp1. In the discontinuous current mode (DCM), the zero crossing of the current flowing through the synchronous rectification transistor M2 is detected, and the OFF levels of both the first pulse signal Sp1 and the second pulse signal Sp2 are maintained from the current zero crossing to the assertion of the next turn-on signal S1.

Figure 2:
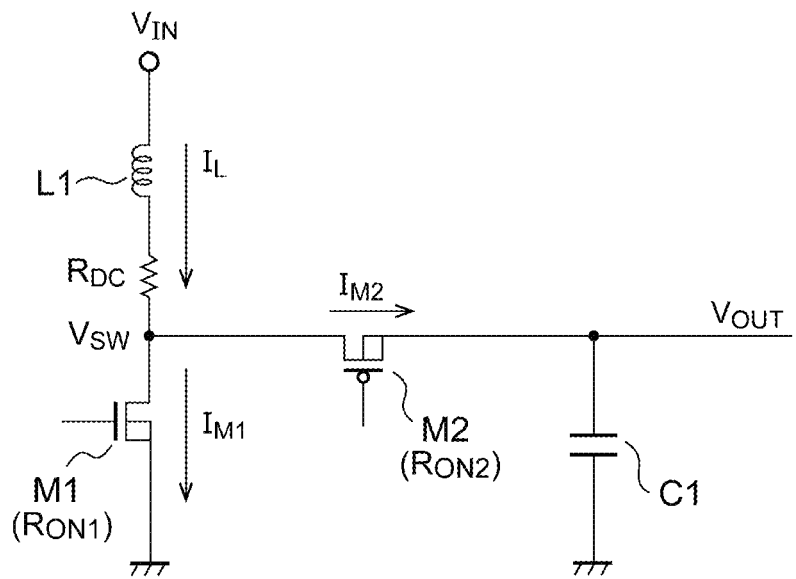
FIG. 2 is an equivalent circuit diagram of an output circuit of a DC/DC converter.

FIG. 2 is the equivalent circuit diagram of the output circuit 110 of the DC/DC converter 100. $R_{DC}$ is an equivalent series resistance such as the inductor L1 and wiring. $R_{ON1}$ represents the ON resistance of the switching transistor M1, and $R_{ON2}$ represents the ON resistance of the synchronous rectification transistor M2.

A switching cycle is defined as T. In an ON state $\varphi_{ON}$ of the switching transistor M1, $I_L=I_{M1}$, and the voltage across the inductor L1 is $\{V_{IN}-(R_{ON1}+R_{DC})\times I_L\}$. Accordingly, an increase in width $\Delta I_{ON}$ of an inductor current $I_L$ in the ON state $\varphi_{ON}$ is expressed by Equation (1). $T_{ON}$ is a length of the ON state and is referred to as the ON time.

$$\Delta I_{ON}=T_{ON}/L\times\{V_{IN}-(R_{ON1}+R_{DC})\times I_L\} \quad (1)$$

In the OFF state (ΦUFF of the switching transistor M1, $I_L=I_{M2}$, and the voltage across the inductor L1 is $\{V_{OUT}+(R_{ON1}+R_{DC})\times I_L-V_{IN}\}$. Accordingly, a decrease in width $\Delta I_{OFF}$ of the inductor current $I_L$ in the OFF state (ΦUFF is expressed by Equation (2).

$$\Delta I_{OFF}=(T-T_{ON})/L\times\{V_{OUT}-(R_{ON2}+R_{DC})\times I_L-V_{IN}\} \quad (2)$$

When the output voltage $V_{OUT}$ is stabilized in the continuous current mode, $\Delta I_{ON}=\Delta I_{OFF}$ holds. Accordingly, a duty cycle d is expressed by Equation (3).

$$d = T_{ON}/T \quad (3)$$
$$= \{V_{OUT} - V_{IN} + (R_{ON2} + R_{DC}) \times I_L\}/\{V_{OUT} - (R_{ON1} - R_{ON2}) \times I_L\}$$

Assuming $R_{ON1}=R_{ON2}=R_{DC}=0$, Equation (4) is obtained.

$$d = T_{ON}/T \quad (4)$$
$$= \{V_{OUT} - V_{IN}\}/V_{OUT}$$

According to the control circuit 300 of FIG. 1, in the boost converter, the switching frequency can be kept constant by adaptively changing the ON time $T_{ON}$ according to the input voltage $V_{IN}$ and the output voltage $V_{OUT}$ in such a way to satisfy Equation (4).

The present disclosure extends to various apparatuses and methods understood as a block diagram or a circuit diagram of FIG. 1 or derived from the description above and is not limited to a specific configuration. Hereinafter, more specific configuration examples and embodiments will be described not in order to narrow the scope of the present invention but to be of help in understanding the essence and operation of the invention and to clarify them.

Next, a configuration of the timer circuit 320 will be described based on some embodiments.

Figure 3:
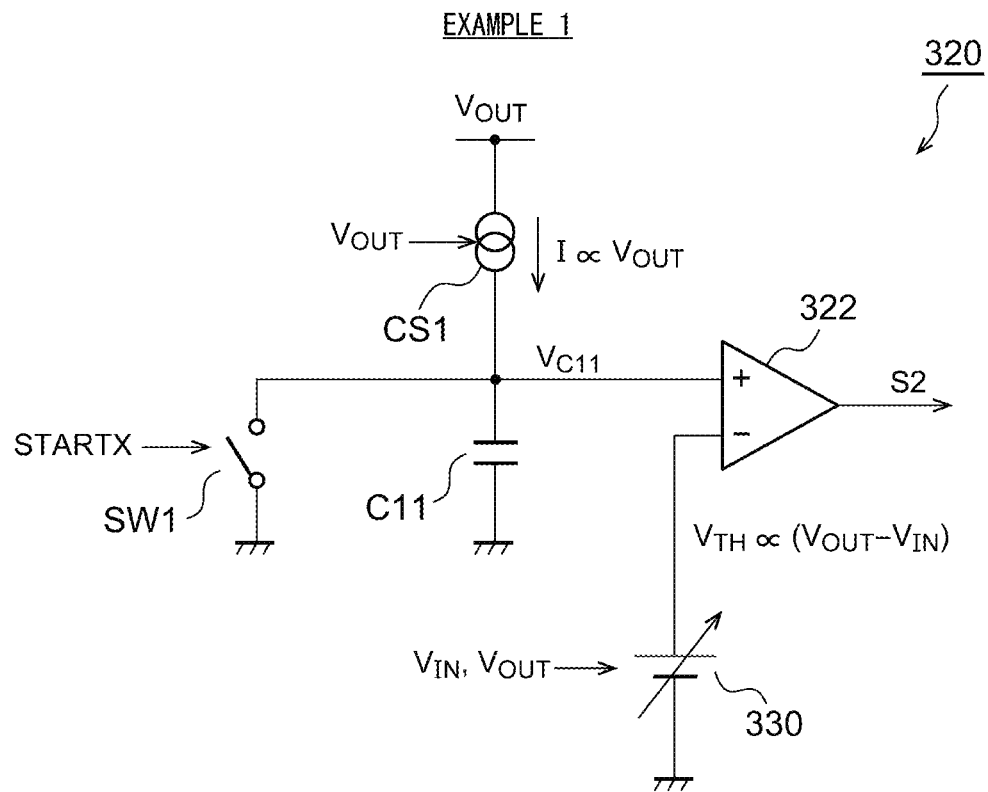
FIG. 3 is a circuit diagram illustrating a basic configuration of a timer circuit.

FIG. 3 is a circuit diagram illustrating a basic configuration of the timer circuit 320. The timer circuit 320 includes a first capacitor C11, a current source CS1, a comparator 322, and a threshold voltage generation circuit 330.

The current source CS1 is connected to the first capacitor C11 and generates a current I ($\propto V_{OUT}$) proportional to $V_{OUT}$. For example, the current source CS1 may be a V/I conversion circuit. The comparator 322 monitors the voltage $V_{C11}$ between both ends of the first capacitor C11 and detects that a voltage change proportional to ($V_{OUT}-V_{IN}$) has occurred.

In FIG. 3, one end of the first capacitor C11 is grounded. The threshold voltage generation circuit 330 generates a threshold voltage $V_{TH} \propto (V_{OUT}-V_{IN})$ proportional to ($V_{OUT}-V_{IN}$). The comparator 322 compares the voltage $V_{C11}$ at the other end of the first capacitor C11 with the threshold voltage $V_{TH}$. A switch SW1 is connected in parallel with the first capacitor C11 and is controlled according to the start signal STARTX.

Figure 4:
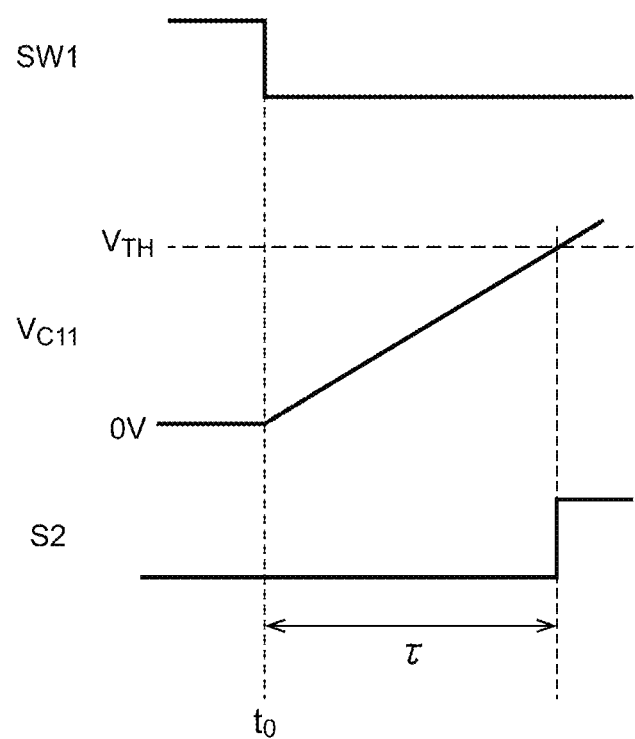
FIG. 4 is an operation waveform diagram of the timer circuit of FIG. 3.

FIG. 4 is an operation waveform diagram of the timer circuit 320 of FIG. 3. Before time $t_0$, the start signal STARTX is high, and the voltage $V_{C11}$ of the first capacitor C11 is 0 V. When the start signal STARTX transitions from high to low at the time $t_0$, the first capacitor C11 is charged by the current I generated by the current source CS1, and the voltage $V_{C11}$ of the first capacitor C11 rises with a slope proportional to the current I.

$$I = \alpha V_{OUT}$$

The voltage $V_{C11}$ of the capacitor after a lapse of time t from the time $t_0$ is expressed by Equation (5).

$$V_{C11} = \alpha V_{OUT} \times t/C11 \quad (5)$$

It is assumed that the threshold voltage $V_{TH}$ is $V_{TH}=\beta \times (V_{OUT}-V_{IN})$. When the time until a capacitor voltage $V_{C11}$ reaches the threshold voltage $V_{TH}$ is represented by $\tau$, Equation (6) holds.

$$\alpha V_{OUT} \times \tau/C11 = \beta \times (V_{OUT}-V_{IN}) \quad (6)$$

When this is solved for $\tau$, Equation (7) is obtained.

$$\tau = \alpha/\beta \times C11 \times (V_{OUT}-V_{IN})/V_{OUT} \quad (7)$$

Therefore, according to the timer circuit 320 of FIG. 2, it is possible to generate the turn-off signal S2 that changes after a time T proportional to ($V_{OUT}-V_{IN}$)/$V_{OUT}$ elapses after the start signal STARTX changes. By driving the DC/DC converter 100 with the time T as the ON time $T_{ON}$, the switching frequency can be stabilized.

Example 1.1

Figure 5:
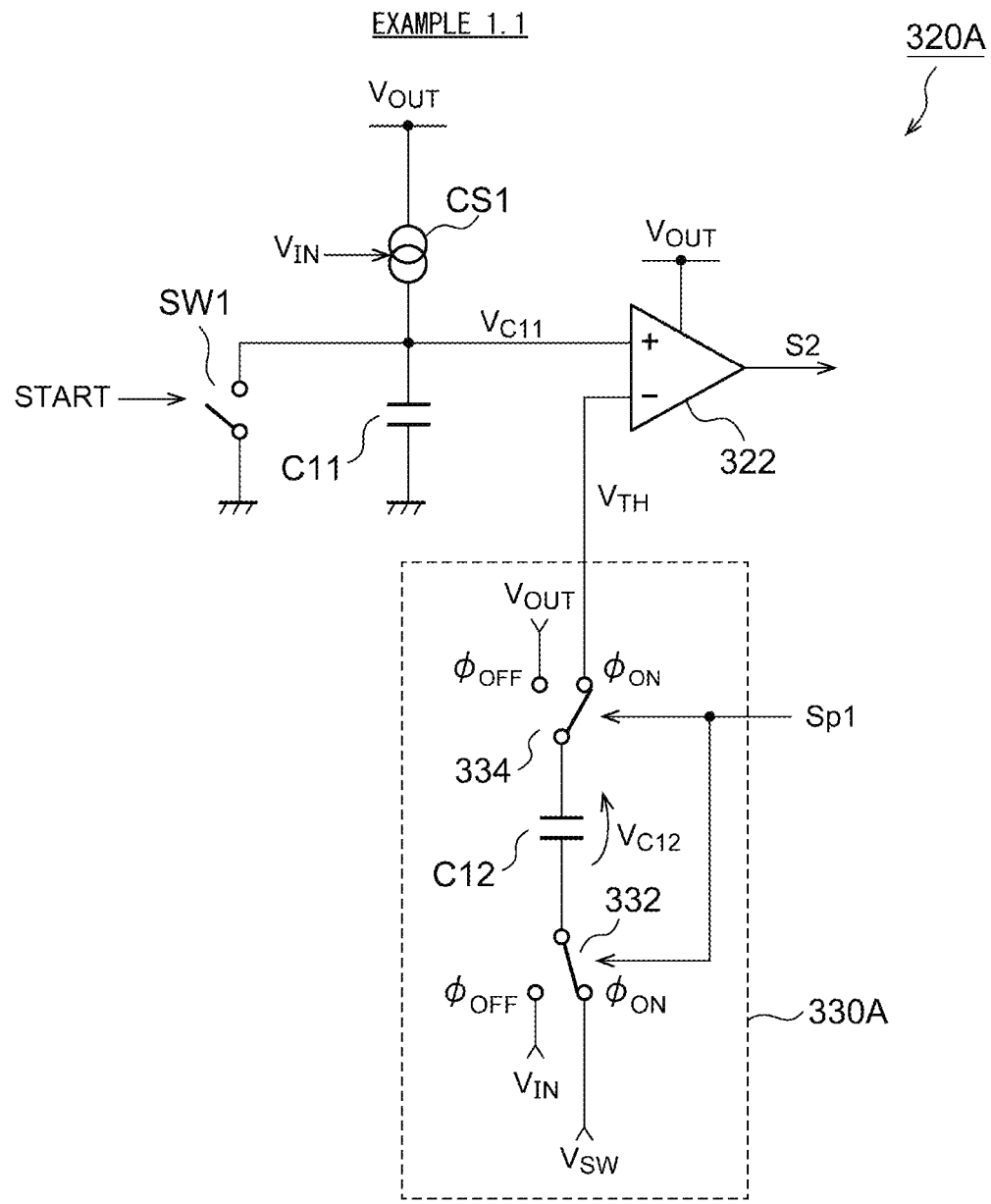
FIG. 5 is a circuit diagram of a timer circuit according to Example 1.1.

FIG. 5 is a circuit diagram of a timer circuit 320A according to Example 1.1. The threshold voltage generation circuit 330A includes a second capacitor C12.

The threshold voltage generation circuit 330A charges the second capacitor C12 with ($V_{OUT}-V_{IN}$) in the OFF state $\varphi_{OFF}$ of the switching transistor M1. In addition, in the ON state $\varphi_{ON}$ of the switching transistor M1, the threshold voltage generation circuit 330A applies the voltage (switching voltage) $V_{SW}$ of the switching pin SW, which is the connection node between the inductor L1 and the switching transistor M1, to one end of the second capacitor C12, and supplies the voltage at the other end of the second capacitor C12 to the comparator 322 as the threshold voltage $V_{TH}$.

For example, the threshold voltage generation circuit 330 incudes a first selector 332 and a second selector 334 in addition to the second capacitor C12. The first selector 332 applies the input voltage $V_{IN}$ to one end of the second capacitor C12 in the OFF state $\varphi_{OFF}$ of the switching transistor M1 and connects one end of the second capacitor C12 to the switching pin SW of the DC/DC converter 100 in the ON state $\varphi_{ON}$ of the switching transistor M1.

The second selector 334 applies the output voltage $V_{OUT}$ to the other end of the second capacitor C12 in the OFF state of the switching transistor M1 and connects the other end of the second capacitor C12 to the comparator 322 in the ON state $\varphi_{ON}$ of the switching transistor M1.

Figure 6:
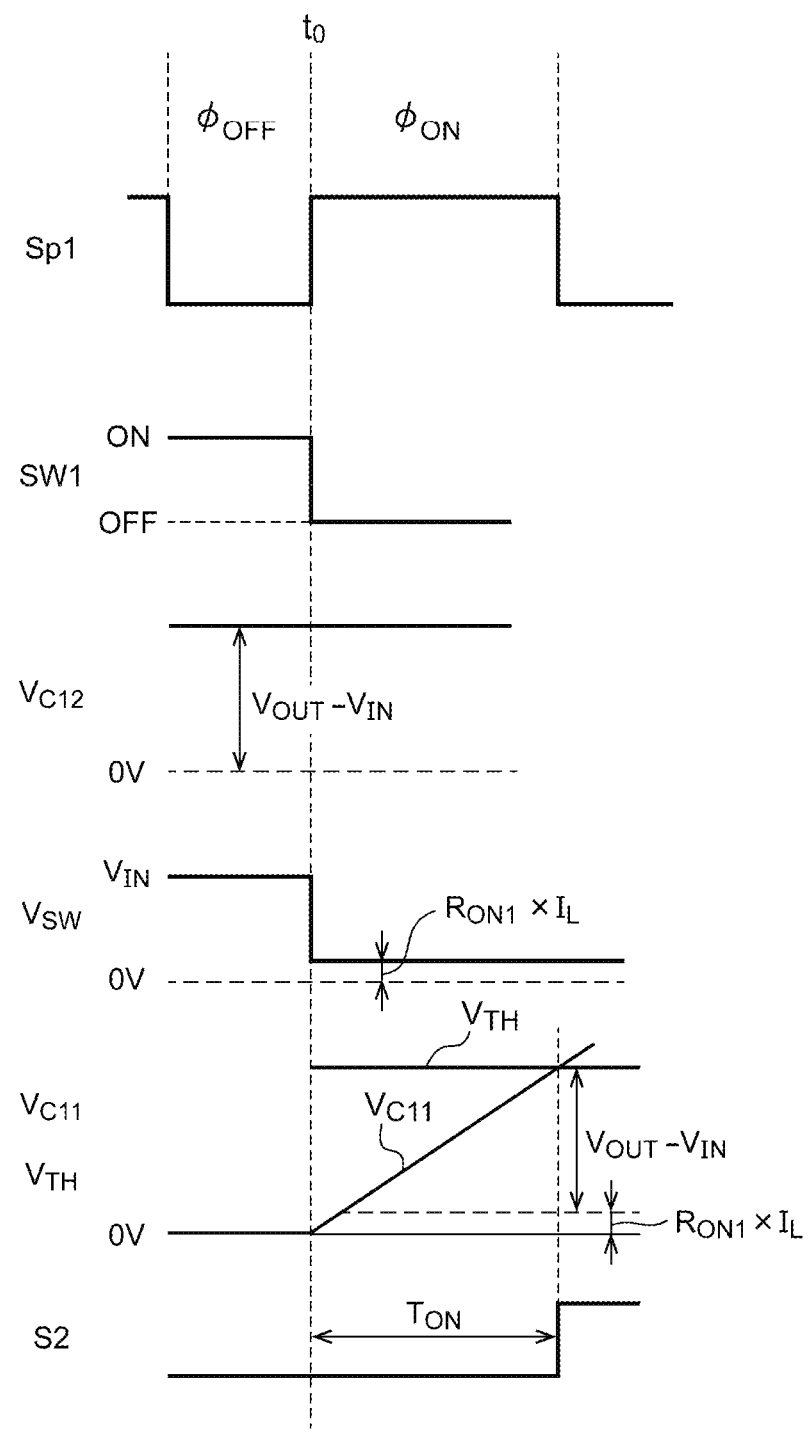
FIG. 6 is an operation waveform diagram of the timer circuit of FIG. 5.

The above is the configuration of the timer circuit 320A. FIG. 6 is an operation waveform diagram of the timer circuit 320A of FIG. 5. Before the time $t_0$, the OFF state $\varphi_{OFF}$ is set, and the second capacitor C12 is charged with ($V_{OUT}-V_{IN}$).

At the time $t_0$, the state changes to the ON state $\varphi_{ON}$. When the switch SW1 is turned off in response to the start signal STARTX, charging of the first capacitor C11 is started, and the capacitor voltage $V_{C11}$ rises with a slope proportional to the output voltage $V_{OUT}$.

Since a potential difference of the second capacitor C12 is maintained during the ON state $\varphi_{ON}$, the threshold voltage $V_{TH}$ is calculated as $$V_{TH} = (V_{OUT} - V_{IN}) + V_{SW} \quad (8)$$
$$= (V_{OUT} - V_{IN}) + R_{ON1} \cdot I_L$$

Therefore, the ON time $T_{ON}$ generated by the timer circuit 320A is expressed as $$T_{ON} = C11/\alpha \times \{(V_{OUT}-V_{IN}) + R_{ON1} \cdot I_L\}/V_{OUT} \quad (9).$$

As described above, according to the timer circuit 320A of FIG. 5, the ON time $T_{ON}$ in consideration of a coil current $I_L$ (that is, a load current) and an ON resistance $R_{ON1}$ of the switching transistor M1 can be generated.

Furthermore, since a low-pass filter is unnecessary as in Example 1.2 and Example 1.3 to be described later, mounting can be performed in a small circuit area.

Example 1.2

Figure 7:
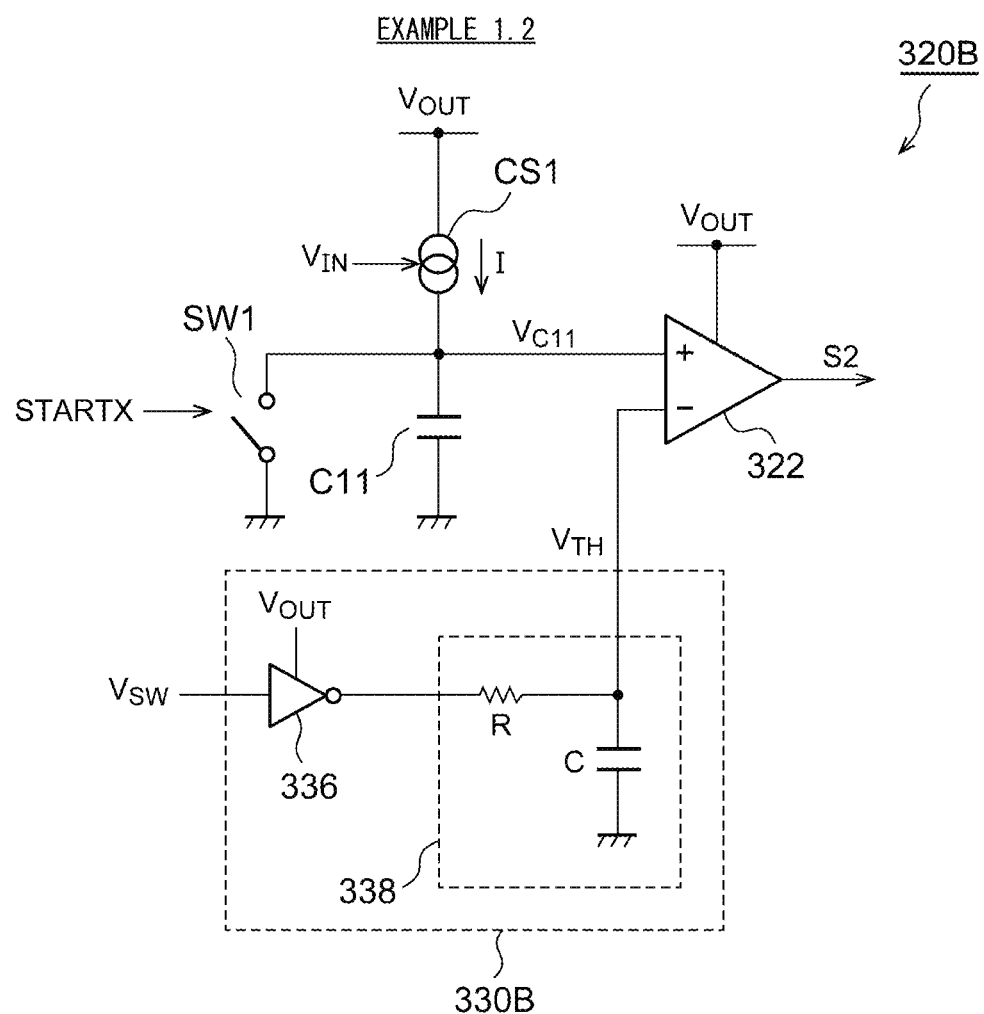
FIG. 7 is a circuit diagram of a timer circuit according to Example 1.2.

FIG. 7 is a circuit diagram of a timer circuit 320B according to Example 1.2. The timer circuit 320B is different from the threshold voltage generation circuit 330A of FIG. 5 in the configuration of a threshold voltage generation circuit 330B.

The threshold voltage generation circuit 330B includes an inverter 336 and a low-pass filter 338. The inverter 336 inverts the switching voltage $V_{SW}$ generated in the switching pin SW. The output voltage $V_{OUT}$ is supplied to the power supply terminal of the inverter 336, and thus an amplitude of the output signal of the inverter 336 is equal to the output voltage $V_{OUT}$.

The low-pass filter 338 smooths the output of the inverter 336 and generates the threshold voltage $V_{TH}$. For example, the low-pass filter 338 can be configured by an RC filter.

Figure 8:
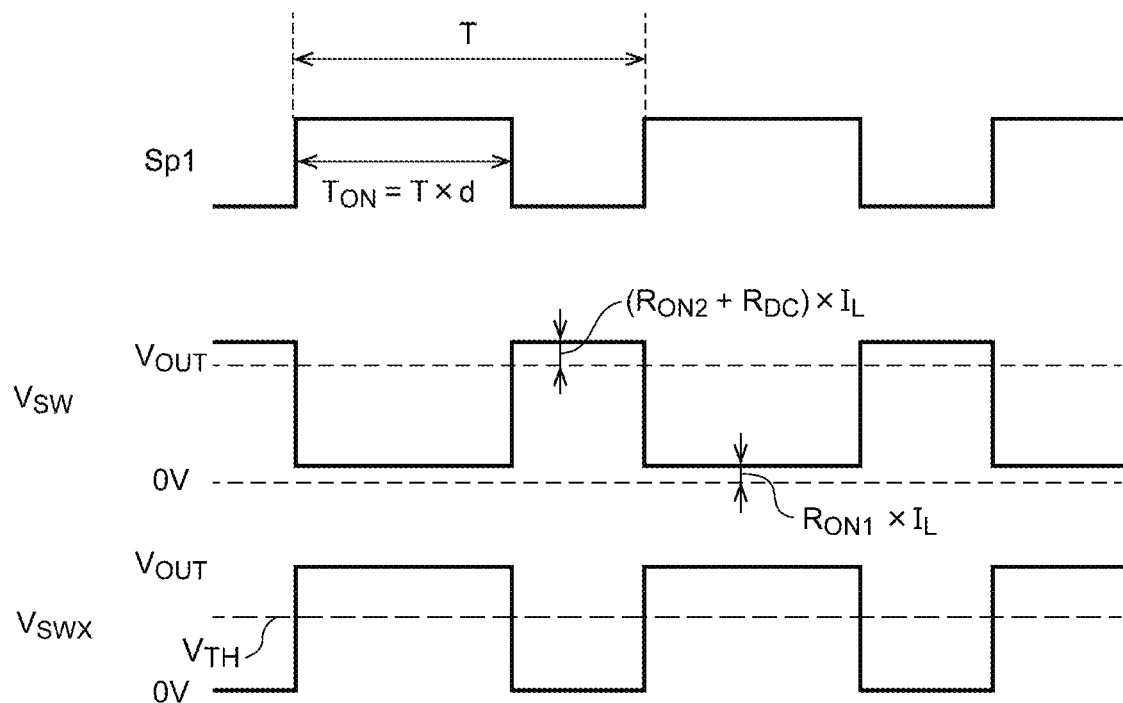
FIG. 8 is an operation waveform diagram of the timer circuit of FIG. 7.

FIG. 8 is an operation waveform diagram of the timer circuit 320B of FIG. 7. The output of the low-pass filter 338 is expressed by Equation (10).

$$V_{TH}=V_{OUT}\times d \quad (10)$$

d is the duty cycle of the first pulse signal Sp1. Since Equation (4) is established in the steady state of the continuous current mode, Equation (11) is obtained from Equations (4) and (10).

$$V_{TH}=V_{OUT}\times\{V_{OUT}-V_{IN}\}/V_{OUT}=V_{OUT}-V_{IN}$$

In other words, the threshold voltage $V_{TH}$ proportional to $V_{OUT}-V_{IN}$ can be generated.

Example 1.3

In Example 1.2, during the continuous current mode, Equation (4) holds, but in the discontinuous current mode in which Equation (4) does not hold, the threshold voltage $V_{TH}$ deviates from an appropriate voltage level. Accordingly, a frequency fluctuation rises immediately after the transition from the discontinuous current mode to the continuous current mode. In Embodiment 1.3, a configuration for solving this problem will be described.

Figure 9:
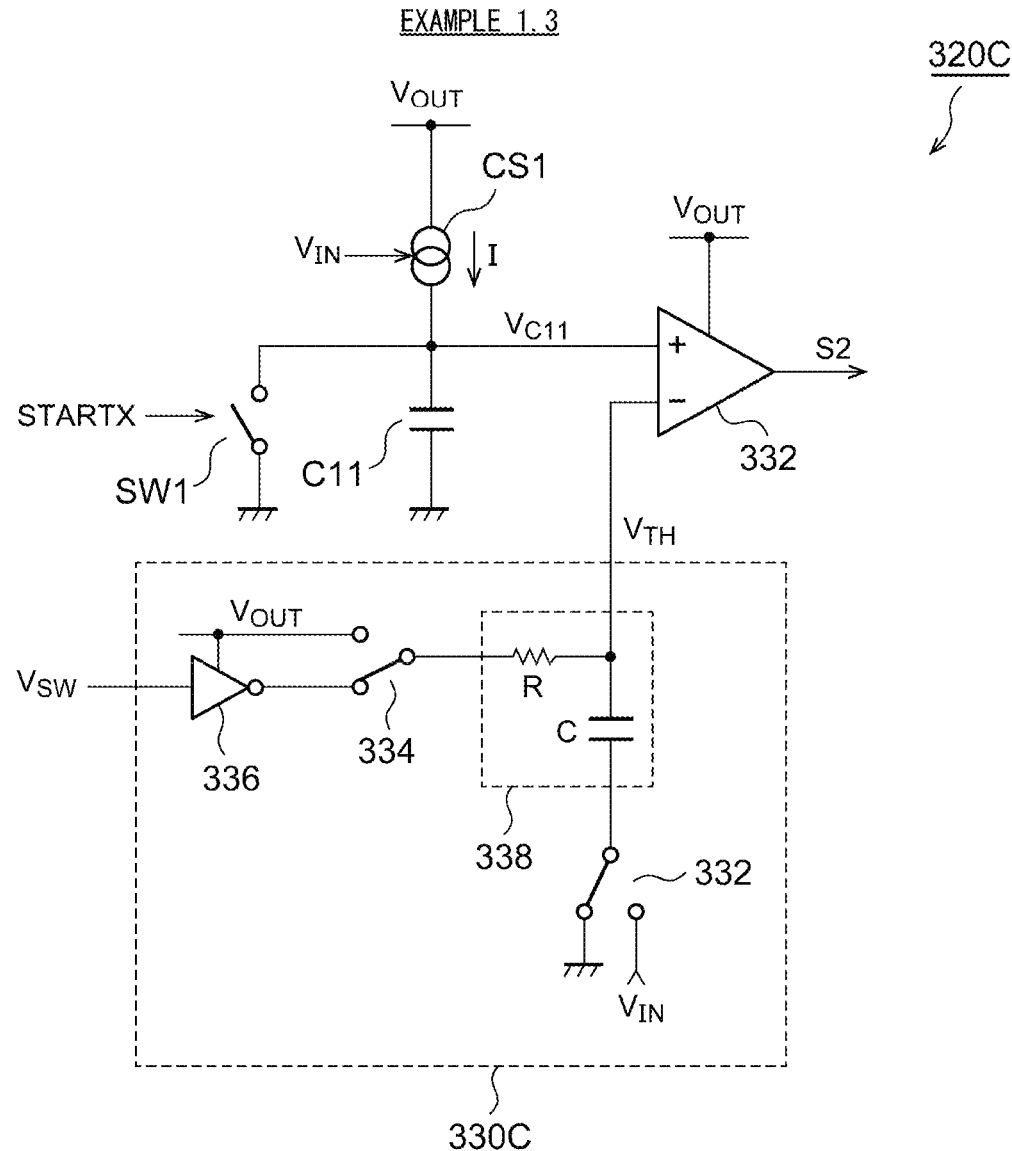
FIG. 9 is a circuit diagram of a timer circuit according to Example 1.3.

FIG. 9 is a circuit diagram of a timer circuit 320C according to Example 1.3. A threshold voltage generation circuit 330C is configured to charge a capacitor C of an RC filter 338 with $V_{OUT}-V_{IN}$ while operating in the discontinuous current mode. Specifically, during the discontinuous current mode, $V_{OUT}$ is applied to one end of the capacitor C, and the input voltage $V_{IN}$ is applied to the other end thereof. For example, the threshold voltage generation circuit 330C includes a third selector 340 and a fourth selector 342 in addition to the inverter 336 and the low-pass filter 338.

The third selector 340 applies the output voltage of the inverter 336 to one end of the resistor R during a continuous current mode $\varphi_{CCM}$ and applies the output voltage $V_{OUT}$ to one end of the resistor R during a discontinuous current mode $\varphi_{DCM}$. Also, the fourth selector 342 applies a ground voltage of 0 V to the other end of the capacitor C during the continuous current mode $\varphi_{CCM}$ and applies an input voltage $V_{IN}$ to the other end of the capacitor C during the discontinuous current mode $\varphi_{DCM}$.

Accordingly, the voltage between both ends of the capacitor C is maintained at $V_{OUT}-V_{IN}$ during the discontinuous current mode $\varphi_{DCM}$, so that the operation can be resumed from the appropriate threshold voltage $V_{TH}$ when the mode is transitioned to the continuous current mode $\varphi_{CCM}$ next.

Example 1.4

Figure 10:
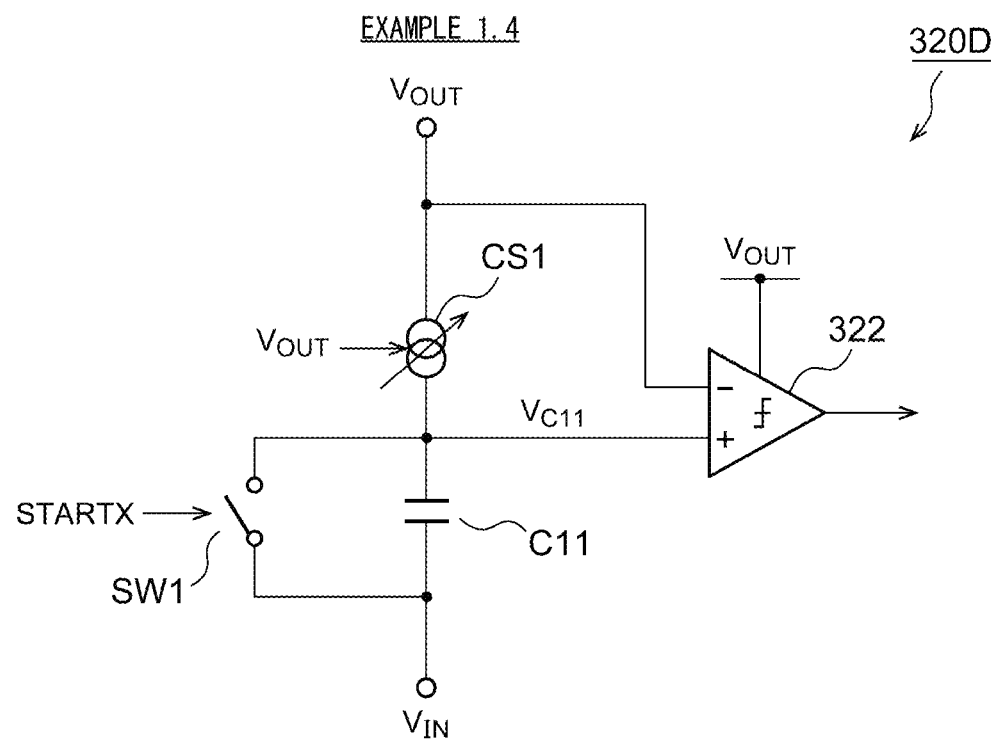
FIG. 10 is a circuit diagram of a timer circuit according to Example 1.4.

FIG. 10 is a circuit diagram of a timer circuit 320D according to Example 1.4. The timer circuit 320D includes the comparator 322, the current source CS1, the capacitor C11, and the switch SW1. An input voltage $V_{IN}$ is applied to one end of the capacitor C11.

When the switch SW1 is in the ON state, the capacitor voltage $V_{C11}$ is equal to the input voltage $V_{IN}$. When the switch SW1 is turned off, the capacitor voltage $V_{C11}$ rises with a slope proportional to the output voltage $V_{OUT}$ with the input voltage $V_{IN}$ as an initial value. The comparator 322 compares the capacitor voltage $V_{C11}$ with the output voltage $V_{OUT}$. An output S2 of the comparator 322 transitions in level when the capacitor voltage $V_{C11}$ changes by $V_{OUT}-V_{IN}$.

In this configuration, since $R_{ON}$ and $R_{DC}$ are ignored, the switching frequency becomes faster in a heavy load state where $I_L$ is large, but the switching frequency can be stabilized with a simple configuration.

Modifications related to the first embodiment will be described.

Modification 1.1

In the first embodiment, the switching transistor M1 and the synchronous rectification transistor M2 are integrated in the control circuit 300, but the present invention is not limited thereto, and the switching transistor M1 and the synchronous rectification transistor M2 may be external discrete elements. In addition, the synchronous rectification transistor M2 may be an N-channel MOSFET, and in that case, a bootstrap circuit may be added to the second driver 316.

Second Embodiment

As a result of studying overcurrent protection in a converter of the ripple control of bottom detection and constant on time (COT), the present inventors have recognized the following problems.

The overcurrent protection monitors a current flowing through the switching transistor (or the inductor) during an ON period of the switching transistor and turns off the switching transistor when a threshold value of the overcurrent is exceeded.

In general, in the overcurrent state, a drooping characteristic in which an output voltage decreases is required. However, in the COT method of bottom detection, since the bottom of the output voltage is maintained at the reference voltage even in the overcurrent state, the drooping characteristic cannot be obtained.

In the second embodiment, a DC/DC converter capable of lowering the output voltage in the overcurrent state and a control circuit thereof will be described.

Figure 11:
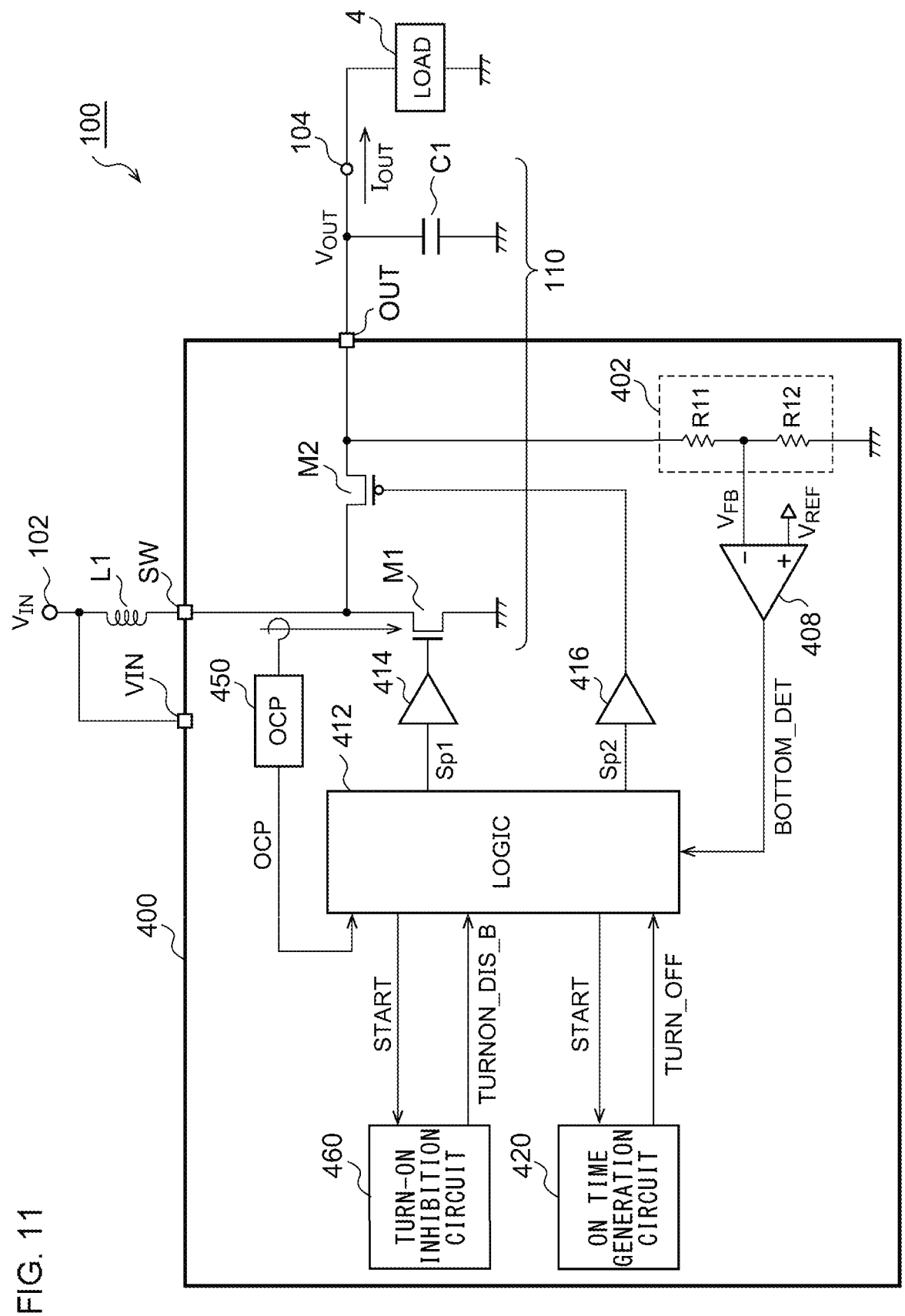
FIG. 11 is a circuit diagram of a DC/DC converter according to the second embodiment.

FIG. 11 is a circuit diagram of the DC/DC converter 100 according to the second embodiment. The DC/DC converter 100 is a boost converter, boosts an input voltage $V_{IN}$ of an input line (an input terminal) 102, stabilizes the input voltage to a predetermined voltage level, and supplies the voltage to a load 4 connected to an output line (output terminal) 104.

The DC/DC converter 100 includes the output circuit 110 and a control circuit 400. The output circuit 110 includes an inductor L1, a switching transistor (a low-side transistor) M1, a synchronous rectification transistor (a high-side transistor) M2, and an output capacitor C1.

The control circuit 400 is a controller of a ripple control method, more specifically, a bottom detection method, and includes the switching pin SW and the output pin OUT. An external inductor L1 is connected to the switching pin SW, and an external output capacitor C1 and the output line 104 are connected to the output pin OUT.

The control circuit 400 includes a voltage dividing circuit 402, a main comparator 408, a logic circuit 412, a first driver 414, a second driver 416, an ON time generation circuit 420, an overcurrent detection circuit 450, a turn-on inhibition circuit 460, the switching transistor M1, and the synchronous rectification transistor M2, and is an integrated circuit (IC) integrated on one semiconductor substrate.

The voltage dividing circuit 402 includes the resistors R11 and R12 and divides the output voltage $V_{OUT}$ to generate the feedback voltage $V_{FB}$.

The main comparator 408 compares the feedback voltage $V_{FB}$ corresponding to the output voltage $V_{OUT}$ of the DC/DC converter 100 with the reference voltage $V_{REF}$ and asserts the turn-on signal TURN_ON when the feedback voltage $V_{FB}$ falls below the reference voltage $V_{REF}$. The turn-on signal TURN_ON is a pulse signal indicating a magnitude relationship between $V_{FB}$ and $V_{REF}$, and one of the positive edge and the negative edge can be associated with the assertion.

The ON time generation circuit 420 generates a turn-off signal TURN_OFF to be asserted after the elapse of the ON time $T_{ON}$ from the turn-on of the switching transistor M1. The ON time $T_{ON}$ may be a predetermined constant time or may be adaptively controlled according to the state of the DC/DC converter 100. The turn-off signal TURN_OFF is a trigger for turning off the switching transistor M1.

The turn-on inhibition circuit 460 asserts a turn-on inhibition signal TURNON_DIS_B for a period until a predetermined time (referred to as the minimum period) $Tp_{(MIN)}$ elapses from the assertion of a start signal START indicating the turn-on of the switching transistor M1. In the present description, _B represents a negative logic, where assertion is assigned low, and negation is assigned high. For example, the start signal START is a signal indicating that the first pulse signal Sp1 instructing on/off of the switching transistor M1 has transitioned to the ON level.

The ON time generation circuit 420 and the turn-on inhibition circuit 460 can be constituted by a timer circuit. The logic circuit 412 supplies the start signal START that triggers operation start to the ON time generation circuit 420 and the turn-on inhibition circuit 460. The start signal START is a signal indicating a turn-on of the switching transistor M1. The start signal START may be the first pulse signal Sp1.

When the current flowing through the switching transistor M1 exceeds an overcurrent threshold value $I_{OCP}$ in the ON period of the switching transistor M1, the overcurrent detection circuit 450 asserts (for example, high) an overcurrent detection signal OCP.

The logic circuit 412 generates the pulse signals Sp1 and Sp2 instructing on and off of the switching transistor M1 and the synchronous rectification transistor M2 based on the turn-on signal TURN_ON, the turn-off signal TURN_OFF, the turn-on inhibition signal TURNON_DIS_B, and the overcurrent detection signal OCP.

When the turn-on signal TURN_ON is asserted in a period in which the turn-on inhibition signal TURNON_DIS_B is negated (high), the logic circuit 412 causes the first pulse signal Sp1 to transition to the ON level (high). During a period in which the turn-on inhibition signal TURNON_DIS_B is asserted (low), even when the turn-on signal TURN_ON is asserted, the first pulse signal Sp1 maintains the OFF level (low).

When the turn-off signal TURN_OFF or the overcurrent detection signal OCP is asserted, the logic circuit 412 causes the first pulse signal Sp1 to transition to the OFF level (low).

In the continuous current mode (CCM), the logic circuit 412 complementarily changes the second pulse signal Sp2 with the first pulse signal Sp1. In the discontinuous current mode (DCM), the zero crossing of the current flowing through the synchronous rectification transistor M2 is detected, and the OFF levels of both the first pulse signal Sp1 and the second pulse signal Sp2 are maintained from the current zero crossing to the assertion of the next turn-on signal TURN_ON.

The above is the configuration of the control circuit 400. Next, the operation will be described.

Figure 12:
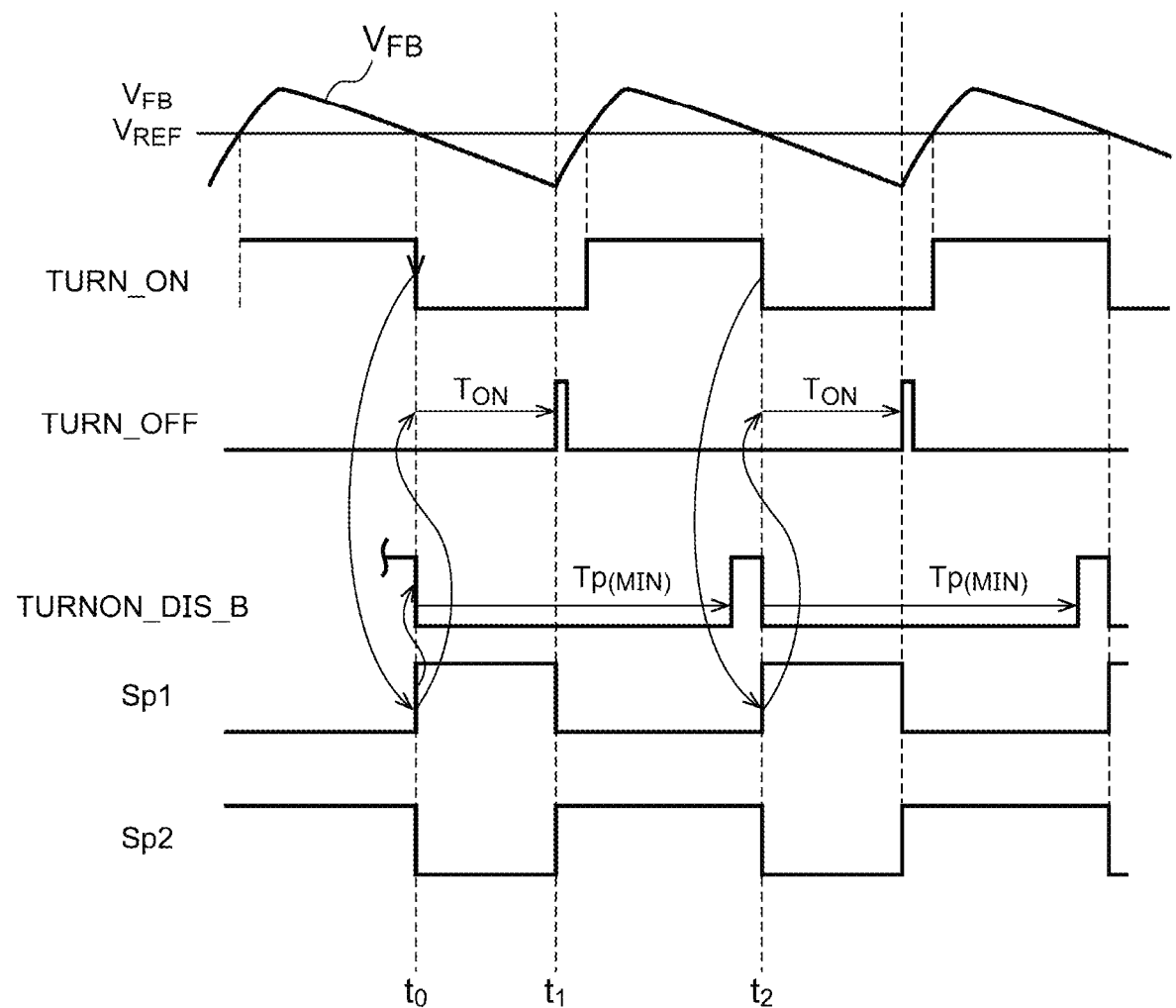
FIG. 12 is an operation waveform diagram of the DC/DC converter of FIG. 11 in a normal state (a non-overcurrent state).

FIG. 12 is an operation waveform diagram of the DC/DC converter 100 of FIG. 11 in the normal state (the non-overcurrent state). Here, the operation is performed in the continuous mode. The ON time $T_{ON}$ generated by the ON time generation circuit 420 is determined such that the switching cycle in the normal state is longer than the minimum cycle $Tp_{(MIN)}$ generated by the turn-on inhibition circuit 460. FIG. 12 illustrates a waveform in which a circuit delay is ignored.

When the feedback voltage $V_{FB}$ decreases to the reference voltage $V_{REF}$ at the time $t_0$, the turn-on signal TURN_ON is asserted. At this timing, since the turn-on inhibition signal TURNON_DIS_B is negated (high), the first pulse signal Sp1 transitions to the ON level in response to the assertion of the turn-on signal TURN_ON. The second pulse signal Sp2 transitions complementarily with the first pulse signal Sp1.

When the switching transistor M1 is turned on at the time $t_0$, the ON time generation circuit 420 starts clocking, and the turn-off signal TURN_OFF is asserted at time $t_1$ after the ON time $T_{ON}$ has elapsed. In this way, the first pulse signal Sp1 transitions to the OFF level, and the switching transistor M1 is turned off. Thereafter, when the feedback voltage $V_{FB}$ decreases to the reference voltage $V_{REF}$ at time $t_2$, the turn-on signal TURN_ON is asserted. This operation is repeated in the normal state.

Figure 13:
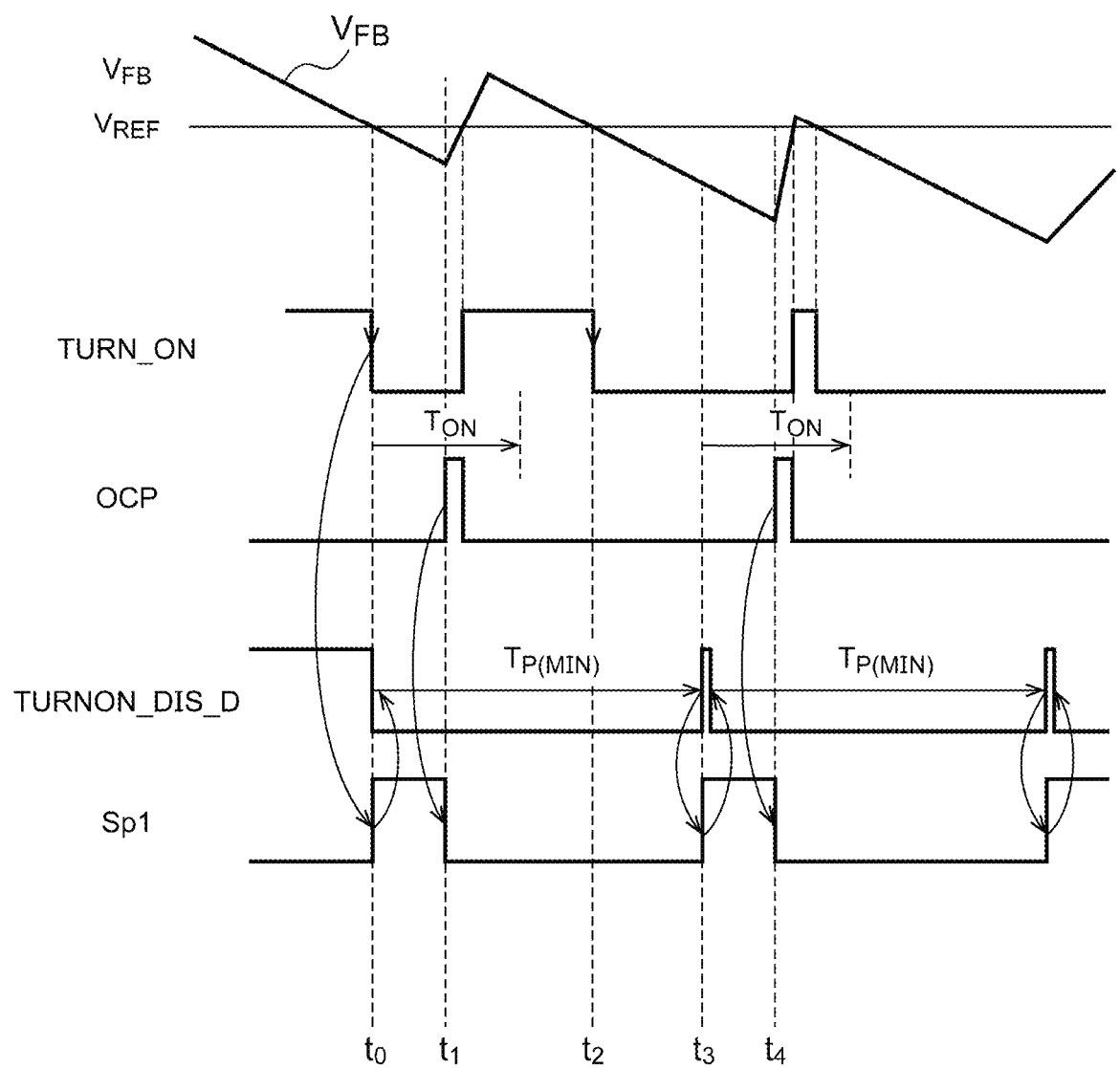
FIG. 13 is an operation waveform diagram in the overcurrent state of the DC/DC converter of FIG. 11.

FIG. 13 is an operation waveform diagram of the DC/DC converter 100 of FIG. 11 in the overcurrent state. When the feedback voltage $V_{FB}$ falls below the reference voltage $V_{REF}$ at the time $t_0$, the turn-on signal TURN_ON is asserted (low). At this timing, since the turn-on inhibition signal TURNON_DIS_B is negated (high), the first pulse signal Sp1 transitions to the ON level in response to the assertion of the turn-on signal TURN_ON. The second pulse signal Sp2 transitions complementarily with the first pulse signal Sp1.

When the switching transistor M1 is turned on at the time $t_0$, the ON time generation circuit 420 and the turn-on inhibition circuit 460 start clocking, and the turn-on inhibition signal TURNON_DIS_B is asserted (low). In the overcurrent state, the overcurrent detection signal OCP is asserted at the time $t_1$ before the ON time $T_{ON}$ elapses, the first pulse signal Sp1 transitions to the OFF level in response to the overcurrent detection signal OCP, and the switching transistor M1 is turned off. This provides pulse-by-pulse overcurrent protection.

The feedback voltage $V_{FB}$ increases immediately after the switching transistor M1 is turned off, and then decreases with time. When the voltage falls below the reference voltage $V_{REF}$ at the time $t_2$, the turn-on signal TURN_ON is asserted. However, at the time $t_2$, since the minimum period $Tp_{(MIN)}$ has not elapsed from the time $t_0$ at which the immediately preceding switching transistor M1 is turned on, the turn-on inhibition signal TURNON_DIS_B is asserted. Therefore, the first pulse signal Sp1 maintains the OFF level.

Thereafter, when the turn-on inhibition signal TURNON_DIS_B is negated at time $t_3$ after the minimum period $Tp_{(MIN)}$ has elapsed from the time $t_1$, the first pulse signal Sp1 transitions to the ON level in response to the turn-on signal TURN_ON already asserted (low) at that time, and the switching transistor M1 is turned on.

When the first pulse signal Sp1 transitions to the ON level at the time $t_3$, the turn-on inhibition signal TURNON_DIS_B is asserted (low), and the turn-on inhibition circuit 460 starts clocking. When the overcurrent detection signal OCP is asserted at time $t_4$, the first pulse signal Sp1 becomes the OFF level, and the switching transistor M1 is turned off.

In the overcurrent state, the operations from $t_1$ to $t_4$ are repeated. The above is the operation of the DC/DC converter 100.

According to the DC/DC converter 100, in the overcurrent state, the switching frequency can be maintained at $1/Tp_{(MIN)}$ while the pulse-by-pulse overcurrent protection is performed. In addition, in the overcurrent state, the feedback voltage $V_{FB}$, that is, the output voltage $V_{OUT}$ can be decreased with time, and the drooping characteristic can be realized.

The present invention extends to various apparatuses and methods understood as the block diagram or cross-sectional diagram of FIG. 11 or derived from the description above and is not limited to a specific configuration. Hereinafter, more specific configuration examples and embodiments will be described not in order to narrow the scope of the present invention but to be of help in understanding the essence and operation of the invention and to clarify them.

A specific configuration example of the control circuit 400 will be described.

Figure 14:
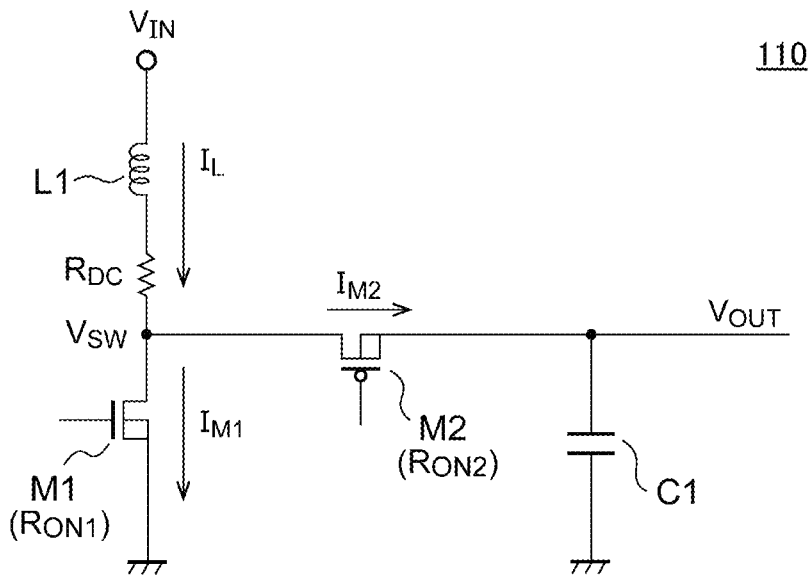
FIG. 14 is an equivalent circuit diagram of an output circuit of the DC/DC converter.

FIG. 14 is an equivalent circuit diagram of the output circuit 110 of the DC/DC converter 100. $R_{DC}$ is an equivalent series resistance such as the inductor L1 and wiring. $R_{ON1}$ represents the ON resistance of the switching transistor M1, and $R_{ON2}$ represents the ON resistance of the synchronous rectification transistor M2.

A switching cycle is defined as T. In an ON state $\varphi_{ON}$ of the switching transistor M1, $I_L=I_{M1}$, and the voltage across the inductor L1 is $\{V_{IN}-(R_{ON1}+R_{DC})\times I_L\}$. Accordingly, an increase in width $\Delta I_{ON}$ of an inductor current $I_L$ in the ON state $\varphi_{ON}$ is expressed by Equation (1). $T_{ON}$ is a length of the ON state and is referred to as the ON time.

$$\Delta I_{ON}=T_{ON}/L\times\{V_{IN}-(R_{ON1}+R_{DC})\times I_L\} \quad (1)$$

In the OFF state $\varphi_{OFF}$ of the switching transistor M1, $I_L=I_{M2}$, and the voltage across the inductor L1 is $\{V_{OUT}+(R_{ON1}+R_{DC})\times V_{IN}\}$. Accordingly, a decrease in width $\Delta I_{OFF}$ of the inductor current $I_L$ in the OFF state $\varphi_{OFF}$ is expressed by Equation (2).

$$\Delta I_{OFF}=(T-T_{ON})/L\times\{V_{OUT}+(R_{ON2}+R_{DC})\times I_L-V_{IN}\} \quad (2)$$

When the output voltage $V_{OUT}$ is stabilized in the continuous current mode, $\Delta I_{ON}=\Delta I_{OFF}$ holds. Accordingly, a duty cycle d is expressed by Equation (3).

$$d = T_{ON}/T \quad (3)$$

$$= \{V_{OUT} - V_{IN} + (R_{ON2} + R_{DC})\times I_L\}/\{V_{OUT} - (R_{ON1} - R_{ON2})\times I_L\}$$

Assuming $R_{ON1}=R_{ON2}=R_{DC}=0$, Equation (4) is obtained.

$$d = T_{ON}/T \quad (4)$$

$$= \{V_{OUT} - V_{IN}\}/V_{OUT}$$

Therefore, when a target period in a non-overcurrent state is $Tp_{(REF)}$, the ON time generation circuit 420 of the control circuit 400 calculates to generate the ON time $T_{ON}$ satisfying the equation below $$T_{ON}=\{V_{OUT}-V_{IN}\}/V_{OUT}\times T_{REF}.$$

This makes it possible to keep the switching frequency of the DC/DC converter 100 constant.

Next, a configuration of the ON time generation circuit 420 will be described based on some embodiments.

Figure 15:
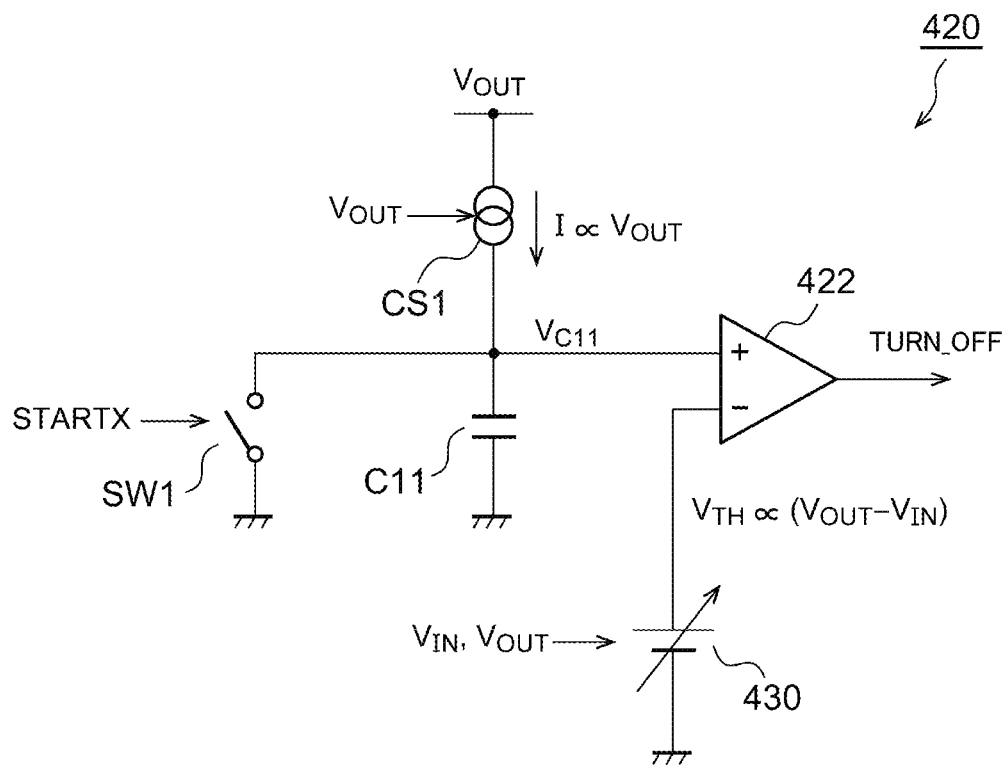
FIG. 15 is a circuit diagram illustrating a basic configuration of an ON time generation circuit.

FIG. 15 is a circuit diagram illustrating a basic configuration of the ON time generation circuit 420. The ON time generation circuit 420 includes the first capacitor C11, the current source CS1, a comparator 422, and a threshold voltage generation circuit 430.

The current source CS1 is connected to the first capacitor C11 and generates a current I ($\propto V_{OUT}$) proportional to $V_{OUT}$. For example, the current source CS1 may be a V/I conversion circuit. The comparator 422 monitors the voltage $V_{C11}$ between both ends of the first capacitor C11 and detects that the voltage change proportional to ($V_{OUT}-V_{IN}$) has occurred.

In FIG. 15, one end of the first capacitor C11 is grounded. The threshold voltage generation circuit 430 generates the threshold voltage $V_{TH}\propto(V_{OUT}-V_{IN})$ proportional to ($V_{OUT}-V_{IN}$). The comparator 422 compares the voltage $V_{C11}$ at the other end of the first capacitor C11 with the threshold voltage $V_{TH}$. The switch SW1 is connected in parallel with the first capacitor C11 and is controlled according to a start signal START_B.

Figure 16:
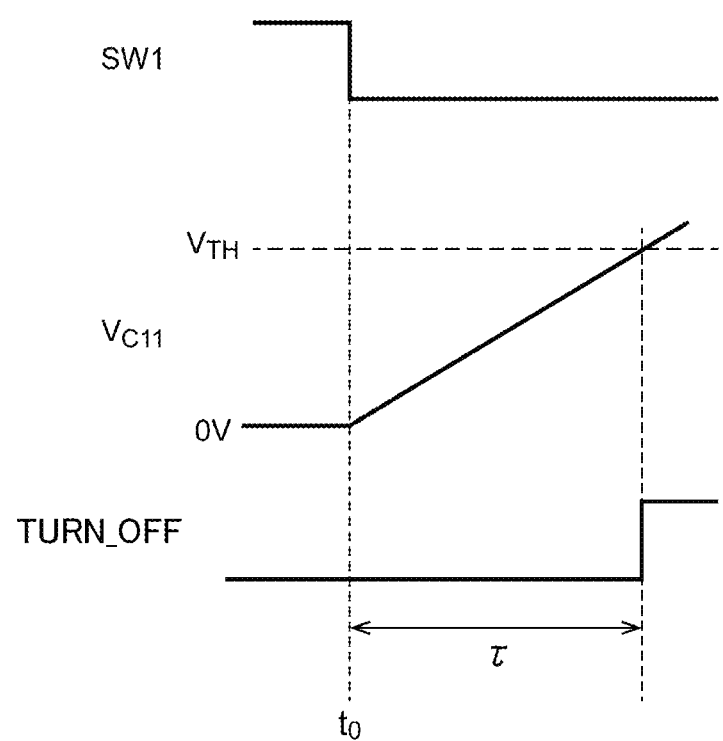
FIG. 16 is an operation waveform diagram of the ON time generation circuit of FIG. 15.

FIG. 16 is an operation waveform diagram of the ON time generation circuit 420 of FIG. 15. Before time $t_0$, the start signal START_B is high, and the voltage $V_{C11}$ of the first capacitor C11 is 0 V. When the start signal START_B transitions from high to low at the time to, the first capacitor C11 is charged by the current I generated by the current source CS1, and the voltage Von of the first capacitor C11 rises with a slope proportional to the current I.

$$I=\alpha V_{OUT}$$

The voltage $V_{C11}$ of the capacitor after a lapse of time t from the time $t_0$ is expressed by Equation (5).

$$V_{C11}=\alpha V_{OUT}\times t/C11 \quad (5)$$

It is assumed that the threshold voltage $V_{TH}$ is $V_{TH}=\beta\times(V_{OUT}-V_{IN})$. When the time until a capacitor voltage $V_{C11}$ reaches the threshold voltage $V_{TH}$ is represented by $\tau$, Equation (6) holds.

$$\alpha V_{OUT}\times\tau/C11=\beta\times(V_{OUT}-V_{IN}) \quad (6)$$

When this is solved for $\tau$, Equation (7) is obtained.

$$\tau=\alpha/\beta\times C_{11}\times(V_{OUT}-V_{IN})/V_{OUT} \quad (7)$$

Therefore, according to the ON time generation circuit 420 in FIG. 15, it is possible to generate the turn-off signal TURN_OFF that changes after the lapse of the time T proportional to $(V_{OUT}-V_{IN})/V_{OUT}$ after the start signal START_B changes. By driving the DC/DC converter 100 with the time T as the ON time $T_{ON}$, the switching frequency can be stabilized.

Example 2.1

Figure 17:
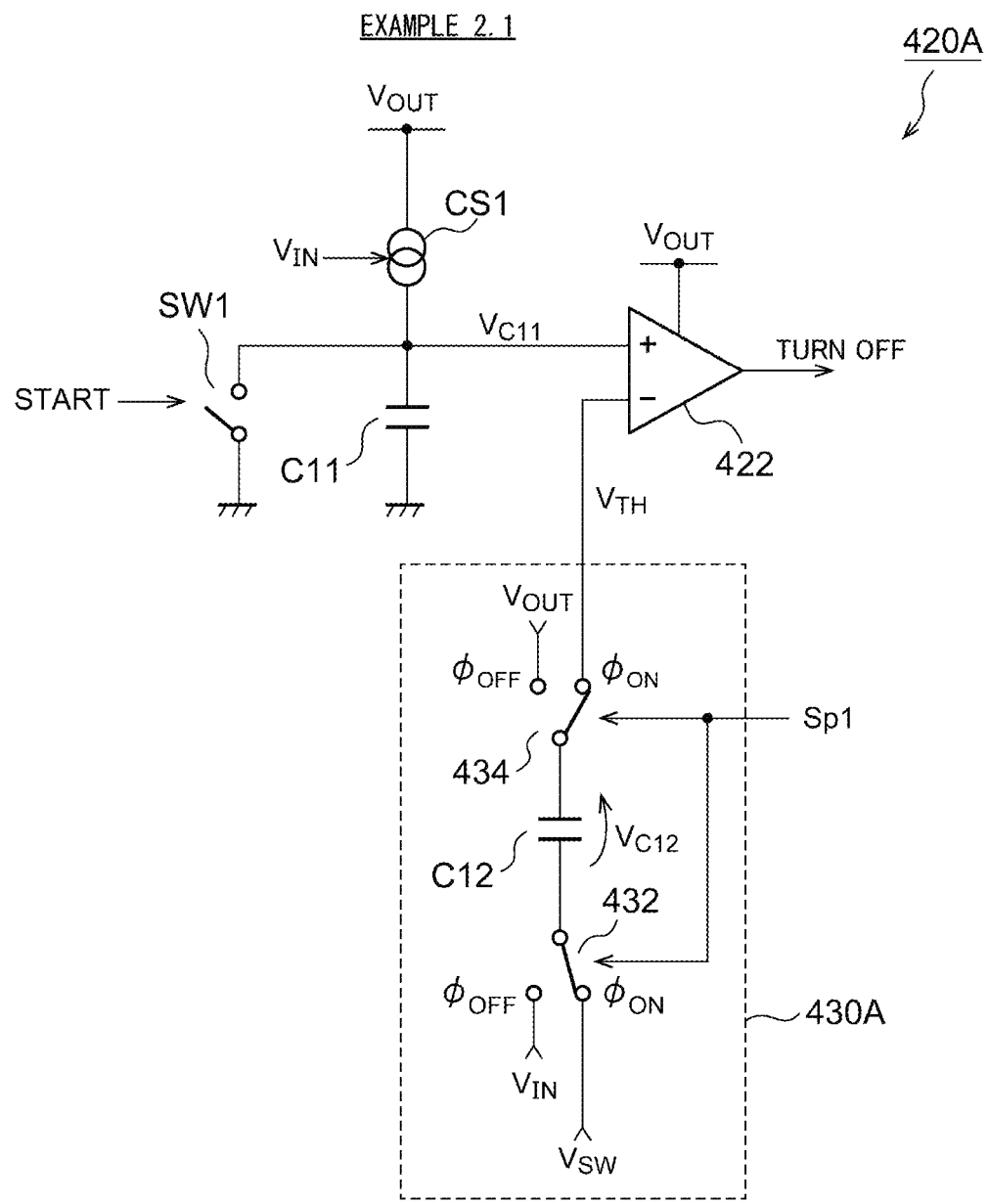
FIG. 17 is a circuit diagram of an ON time generation circuit according to Example 2.1.

FIG. 17 is a circuit diagram of an ON time generation circuit 420A according to Example 2.1. The threshold voltage generation circuit 430A includes the second capacitor C12.

The threshold voltage generation circuit 430A charges the second capacitor C12 with $(V_{OUT}-V_{IN})$ in the OFF state $\varphi_{OFF}$ of the switching transistor M1. In addition, in the ON state $\varphi_{ON}$ of the switching transistor M1, the threshold voltage generation circuit 430A applies the voltage (switching voltage) $V_{SW}$ of the switching pin SW, which is the connection node between the inductor L1 and the switching transistor M1, to one end of the second capacitor C12, and supplies the voltage at the other end of the second capacitor C12 to the comparator 422 as the threshold voltage $V_{TH}$.

For example, the threshold voltage generation circuit 430 includes a first selector 432 and a second selector 434 in addition to the second capacitor C12. The first selector 432 applies the input voltage $V_{IN}$ to one end of the second capacitor C12 in the OFF state $\varphi_{OFF}$ of the switching transistor M1 and connects one end of the second capacitor C12 to the switching pin SW of the DC/DC converter 100 in the ON state $\varphi_{ON}$ of the switching transistor M1.

The second selector 434 applies the output voltage $V_{OUT}$ to the other end of the second capacitor C12 in the OFF state of the switching transistor M1 and connects the other end of the second capacitor C12 to the comparator 422 in the ON state $\varphi_{ON}$ of the switching transistor M1.

Figure 18:
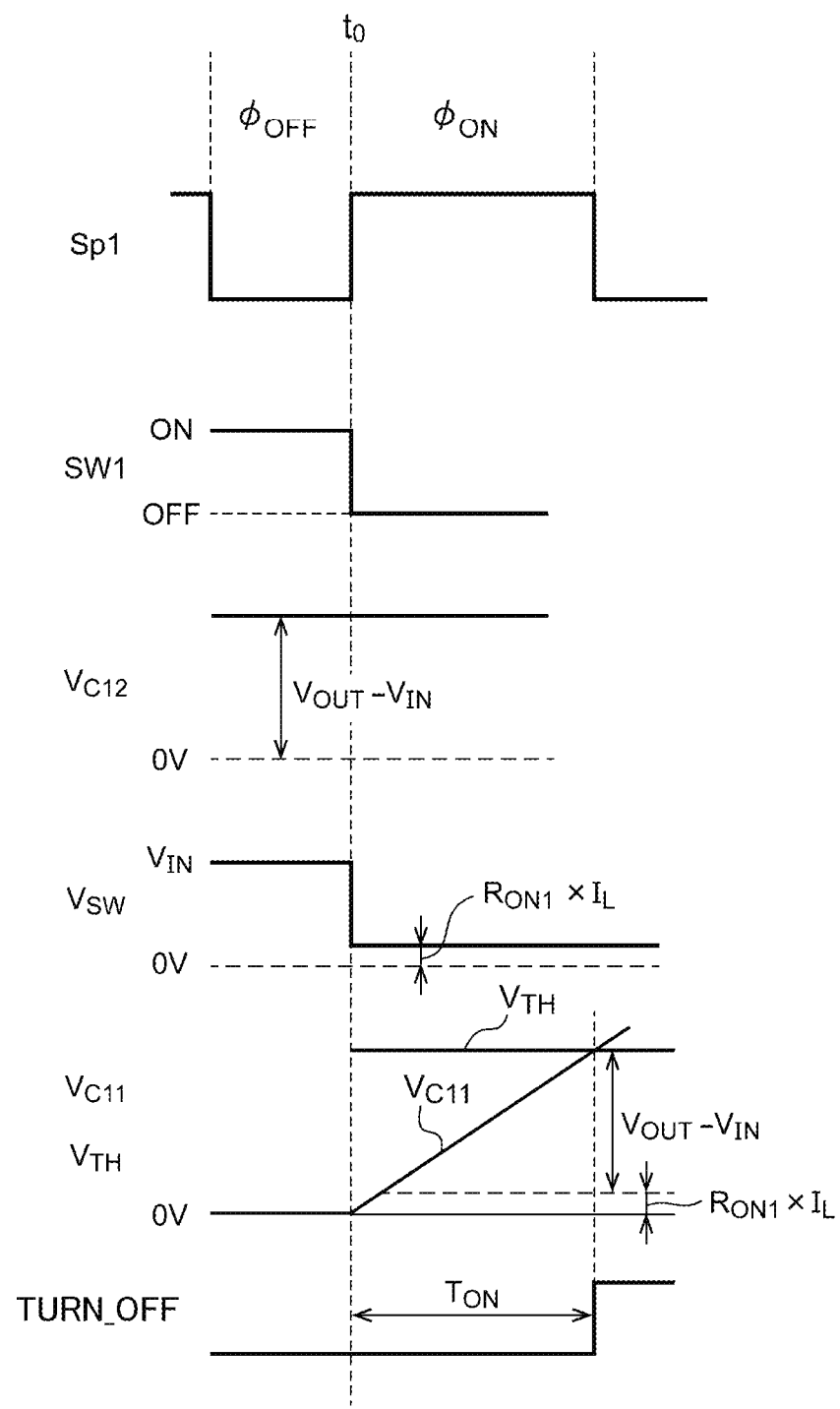
FIG. 18 is an operation waveform diagram of the ON time generation circuit of FIG. 17.

The above is the configuration of the ON time generation circuit 420A. FIG. 18 is an operation waveform diagram of the ON time generation circuit 420A in FIG. 17. Before the time $t_0$, the OFF state $\varphi_{OFF}$ is set, and the second capacitor C12 is charged with $(V_{OUT}-V_{IN})$.

At the time $t_0$, the state changes to the ON state $\varphi_{ON}$. When the switch SW1 is turned off in response to the start signal START_B, charging of the first capacitor C11 is started, and the capacitor voltage $V_{C11}$ rises with a slope proportional to the output voltage $V_{OUT}$.

Since a potential difference of the second capacitor C12 is maintained during the ON state $\varphi_{ON}$, the threshold voltage $V_{TH}$ is calculated as $$V_{TH} = (V_{OUT}-V_{IN}) + V_{SW} \\ = (V_{OUT}-V_{IN}) + R_{ON1} \cdot I_L \quad (8)$$

Therefore, the ON time $T_{ON}$ generated by the ON time generation circuit 420A is expressed as follows.

$$T_{ON}=C11/\alpha\times\{(V_{OUT}-V_{IN})+R_{ON1}\cdot I_L\}/V_{OUT} \quad (9)$$

As described above, according to the ON time generation circuit 420A of FIG. 17, the ON time $T_{ON}$ in consideration of the coil current $I_L$ (that is, the load current) and an ON resistance $R_{ON1}$ of the switching transistor M1 can be generated.

In addition, since a low-pass filter is unnecessary as in Example 2.2 and Example 2.3 to be described later, mounting can be performed in a small circuit area.

Example 2.2

Figure 19:
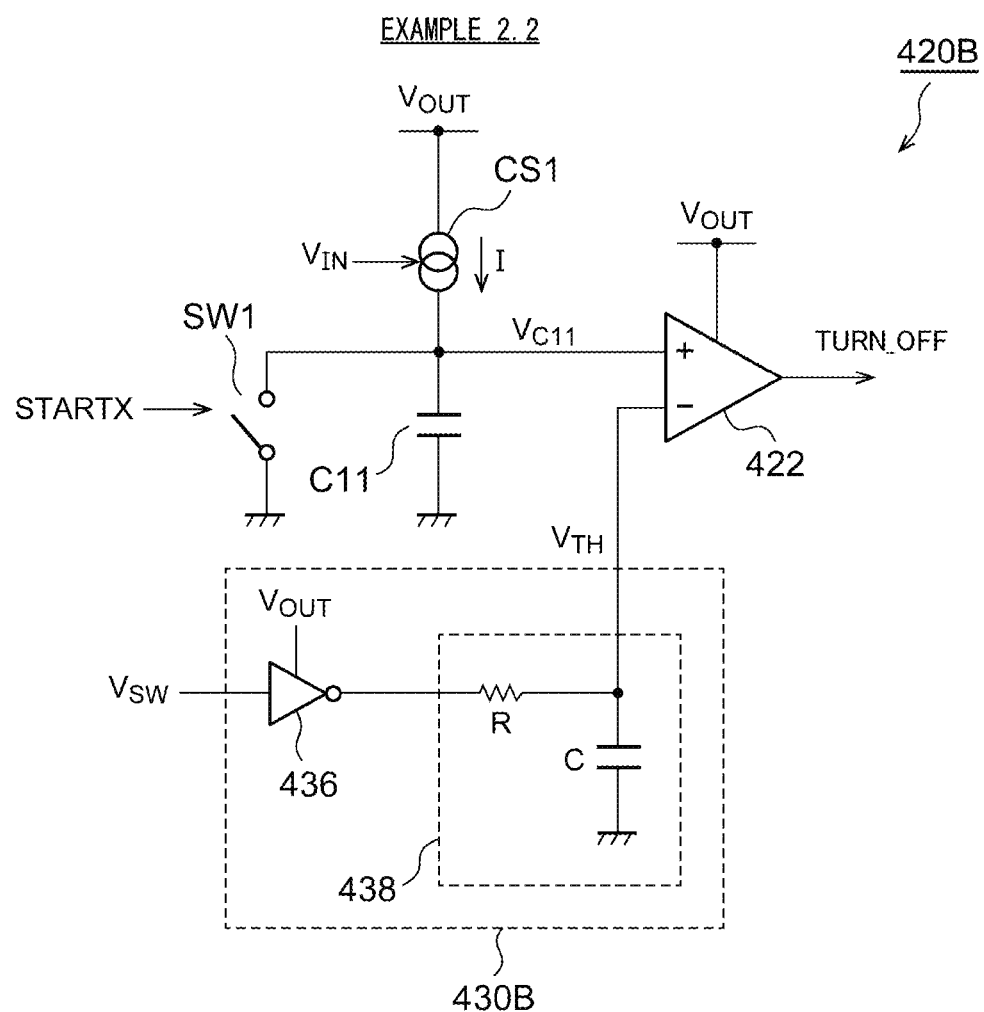
FIG. 19 is a circuit diagram of an ON time generation circuit according to Example 2.2.

FIG. 19 is a circuit diagram of an ON time generation circuit 420B according to Example 2.2. The ON time generation circuit 420B is different from the threshold voltage generation circuit 430A of FIG. 17 in the configuration of the threshold voltage generation circuit 430B.

The threshold voltage generation circuit 430B includes an inverter 436 and a low-pass filter 438. The inverter 436 inverts the switching voltage $V_{SW}$ generated in the switching pin SW. The output voltage $V_{OUT}$ is supplied to the power supply terminal of the inverter 436, and thus an amplitude of the output signal of the inverter 436 is equal to the output voltage $V_{OUT}$.

The low-pass filter 438 smooths the output of the inverter 436 and generates the threshold voltage $V_{TH}$. For example, the low-pass filter 438 can be configured by the RC filter.

Figure 20:
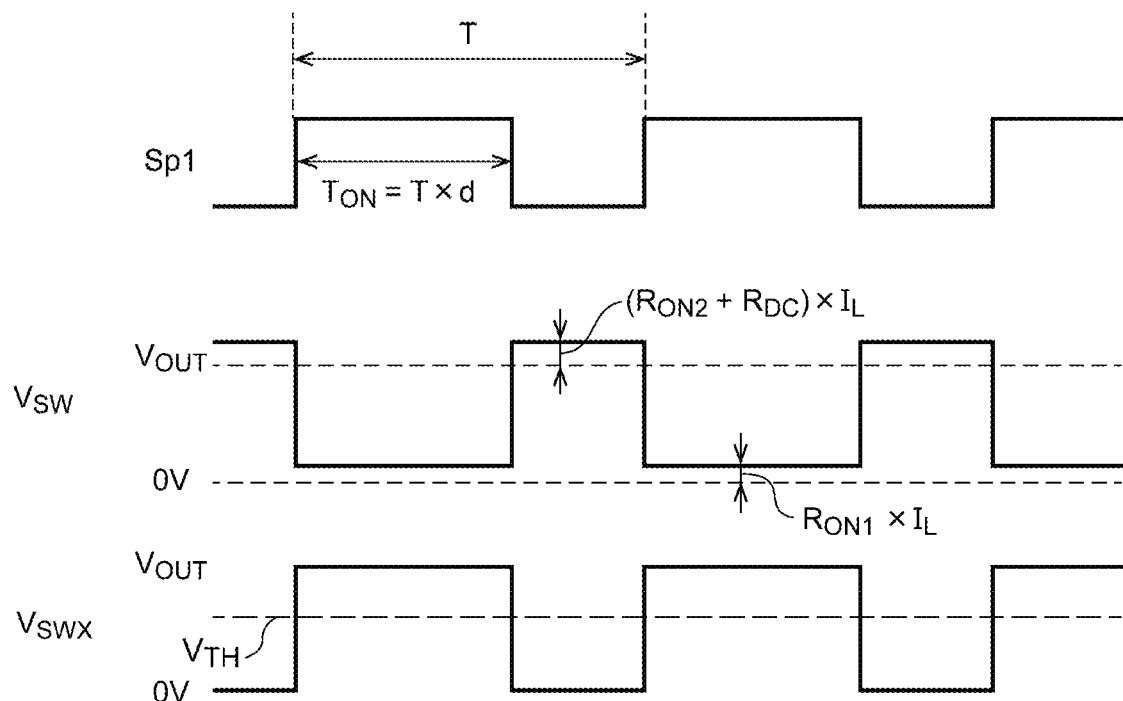
FIG. 20 is an operation waveform diagram of the ON time generation circuit of FIG. 19.

FIG. 20 is an operation waveform diagram of the ON time generation circuit 420B in FIG. 19. The output of the low-pass filter 438 is expressed by Equation (10).

$$V_{TH}=V_{OUT}\times d \quad (10)$$

d is the duty cycle of the first pulse signal Sp1. Since Equation (4) is established in the steady state of the continuous current mode, Equation (11) is obtained from Equations (4) and (10).

$$V_{TH}=V_{OUT}\times\{(V_{OUT}-V_{IN})/V_{OUT}=V_{OUT}-V_{IN}$$

In other words, the threshold voltage $V_{TH}$ proportional to $V_{OUT}-V_{IN}$ can be generated.

Example 2.3

In Example 2.2, Equation (4) holds during the continuous current mode, but in the discontinuous current mode in which Equation (4) does not hold, the threshold voltage $V_{TH}$ deviates from an appropriate voltage level. Accordingly, a frequency fluctuation rises immediately after the transition from the discontinuous current mode to the continuous current mode. In Example 2.3, a configuration for solving this problem will be described.

Figure 21:
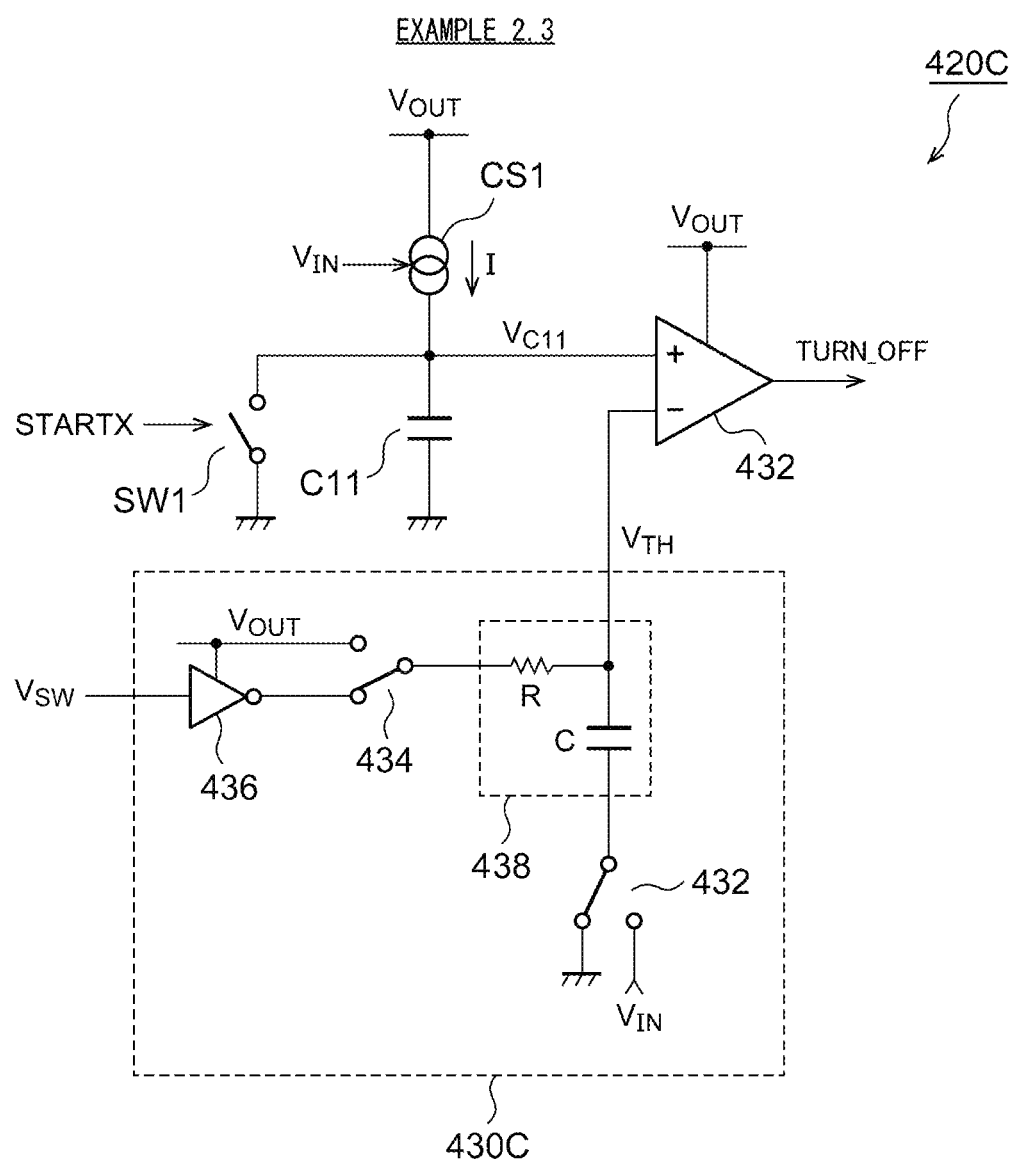
FIG. 21 is a circuit diagram of an ON time generation circuit according to Example 2.3.

FIG. 21 is a circuit diagram of an ON time generation circuit 420C according to Example 2.3. A threshold voltage generation circuit 430C is configured to charge the capacitor C of an RC filter 438 with $V_{OUT}-V_{IN}$ while operating in the discontinuous current mode. Specifically, during the discontinuous current mode, $V_{OUT}$ is applied to one end of the capacitor C, and the input voltage $V_{IN}$ is applied to the other end thereof. For example, the threshold voltage generation circuit 430C includes a third selector 440 and a fourth selector 442 in addition to the inverter 436 and the low-pass filter 438.

The third selector 440 applies the output voltage of the inverter 436 to one end of the resistor R during a continuous current mode $\varphi_{CCM}$ and applies the output voltage $V_{OUT}$ to one end of the resistor R during a discontinuous current mode $\varphi_{DCM}$. Also, the fourth selector 442 applies a ground voltage of 0 V to the other end of the capacitor C during the continuous current mode $\varphi_{CCM}$ and applies an input voltage $V_{IN}$ to the other end of the capacitor C during the discontinuous current mode $\varphi_{DCM}$.

Accordingly, the voltage between both ends of the capacitor C is maintained at $V_{OUT} V_{IN}$ during the discontinuous current mode $\varphi_{DCM}$, so that the operation can be resumed from the appropriate threshold voltage $V_{TH}$ when the mode is transitioned to the continuous current mode $\varphi_{CCM}$ next.

Example 2.4

Figure 22:
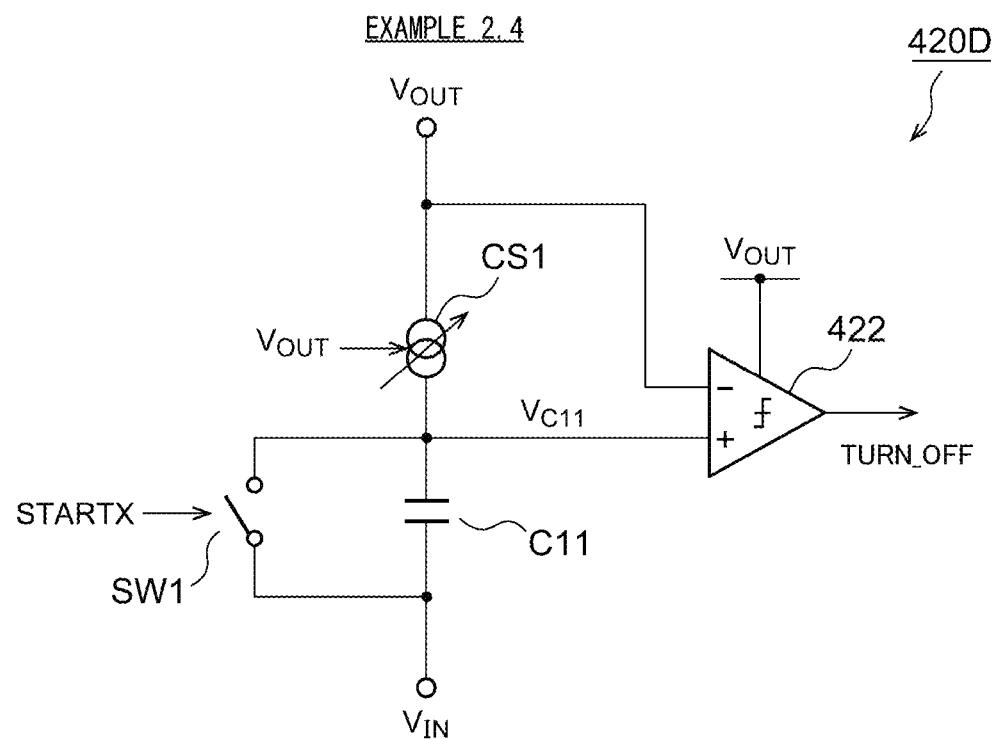
FIG. 22 is a circuit diagram of an ON time generation circuit according to Example 2.4.

FIG. 22 is a circuit diagram of an ON time generation circuit 420D according to Example 2.4. The ON time generation circuit 420D includes the comparator 422, the current source CS1, the capacitor C11, and the switch SW1. An input voltage $V_{IN}$ is applied to one end of the capacitor C11.

When the switch SW1 is in the ON state, the capacitor voltage $V_{C11}$ is equal to the input voltage $V_{IN}$. When the switch SW1 is turned off, the capacitor voltage $V_{C11}$ rises with a slope proportional to the output voltage $V_{OUT}$ with the input voltage $V_{IN}$ as an initial value. The comparator 422 compares the capacitor voltage $V_{C11}$ with the output voltage $V_{OUT}$. The output TURN_OFF of the comparator 422 transitions in level when the capacitor voltage $V_{C11}$ changes by $V_{OUT}-V_{IN}$.

In this configuration, since $R_{ON}$ and $R_{DC}$ are ignored, the switching frequency becomes faster in a heavy load state where $I_L$ is large, but the switching frequency can be stabilized with a simple configuration.

Hereinafter, modifications related to the second embodiment will be described.

Modification 2.1

In the second embodiment, the switching transistor M1 and the synchronous rectification transistor M2 are integrated in the control circuit 400, but the present invention is not limited thereto, and the switching transistor M1 and the synchronous rectification transistor M2 may be external discrete elements. In addition, the synchronous rectification transistor M2 may be an N-channel MOSFET, and in that case, a bootstrap circuit may be added to the second driver 416.

Modification 2.2

Although the boost converter has been described in the second embodiment, the present invention is also applicable to a buck converter and a boost-buck converter.

The embodiments merely illustrate the principle and application of the present invention, and many modifications and changes in configuration can be made to the embodiments without departing from the gist of the present invention defined in the claims.

What is claimed is:

1. A control circuit of a DC/DC converter that boosts an input voltage $V_{IN}$ and generates an output voltage $V_{OUT}$, the control circuit comprising:
a main comparator structured to compare a feedback voltage corresponding to an output voltage of the DC/DC converter with a reference voltage, and to assert a turn-on signal when the feedback voltage falls below the reference voltage; and
a timer circuit structured to generate a turn-off signal that transitions in level after an ON time that is proportional to $(V_{OUT}-V_{IN})/V_{OUT}$ has elapsed from assertion of the turn-on signal.

2. The control circuit according to claim 1, wherein the timer circuit includes
a first capacitor;
a current source structured to be connected to the first capacitor and to generate a current proportional to $V_{OUT}$; and
a comparator structured to detect that a voltage change proportional to $(V_{OUT}-V_{IN})$ has occurred in the first capacitor.

3. The control circuit according to claim 2, wherein
one end of the first capacitor is grounded,
the timer circuit further includes a threshold voltage generation circuit structured to generate a threshold voltage according to $(V_{OUT}-V_{IN})$, and
the comparator is structured to compare a voltage of the other end of the first capacitor with the threshold voltage.

4. The control circuit according to claim 3, wherein the threshold voltage generation circuit includes a second capacitor, charges the second capacitor with $(V_{OUT}-V_{IN})$ during an OFF period of a switching transistor, applies a switching voltage of a connection node between an inductor and the switching transistor to one end of the second capacitor during an ON period of the switching transistor, and sets a voltage of the other end of the second capacitor as the threshold voltage.

5. The control circuit according to claim 3, wherein
the threshold voltage generation circuit includes:
a second capacitor;
a first selector structured to apply the input voltage $V_{IN}$ to one end of a second capacitor during an OFF period of a switching transistor and to connect the one end of the second capacitor with an inductor of the DC/DC converter and a connection node of the switching transistor during an ON period of the switching transistor; and
a second selector structured to apply the output voltage $V_{OUT}$ to the other end of the second capacitor during the OFF period of the switching transistor, and to connect the other end of the second capacitor to the comparator during the ON period of the switching transistor.

6. The control circuit according to claim 3, wherein
the threshold voltage generation circuit includes:
an inverter structured to invert a switching voltage generated at a connection node between an inductor of the DC/DC converter and a switching transistor; and
a filter structured to smooth an output of the inverter and to generate the threshold voltage.

7. The control circuit according to claim 6, wherein the filter is an RC filter, and
the threshold voltage generation circuit charges a capacitor of the RC filter with $V_{OUT}-V_{IN}$ while operating in a discontinuous current mode.

8. The control circuit according to claim 6, wherein
the filter is an RC filter including a resistor and a capacitor, and
the threshold voltage generation circuit further includes:
a third selector structured to apply the output voltage of the inverter to one end of the resistor during a continuous current mode, and to apply the output voltage $V_{OUT}$ to the one end of the resistor during a discontinuous current mode; and
a fourth selector structured to apply a ground voltage to the other end of the capacitor during the continuous current mode, and to apply the input voltage $V_{IN}$ to the other end of the capacitor during the discontinuous current mode.

9. The control circuit according to claim 2, wherein the input voltage $V_{IN}$ is applied to one end of the first capacitor, and
the comparator compares a voltage of the other end of the first capacitor with the output voltage $V_{OUT}$.

10. The control circuit according to claim 1, wherein the control circuit is integrally integrated on one semiconductor substrate.

11. A power supply circuit comprising:
an output circuit of a boost DC/DC converter, and
the control circuit according to claim 1.

12. A control circuit of a DC/DC converter including a switching transistor, the control circuit comprising:
- a main comparator structured to compare a feedback voltage corresponding to an output voltage of the DC/DC converter with a reference voltage, and to assert a turn-on signal when the feedback voltage falls below the reference voltage;
- an ON time generation circuit structured to assert a turn-off signal after an ON time elapses from turn-on of the switching transistor;
- an overcurrent detection circuit structured to assert an overcurrent detection signal when a current flowing through the switching transistor exceeds an overcurrent threshold value in an ON period of the switching transistor;
- a turn-on inhibition circuit structured to generate a turn-on inhibition signal to be asserted during a period from turn-on of the switching transistor to elapse of a predetermined time;
- a logic circuit structured to generate a pulse signal that transitions to an ON level when the turn-on signal is asserted and transitions to an OFF level when the turn-off signal or the overcurrent detection signal is asserted, during a period in which the turn-on inhibition signal is negated; and
- a driver structured to drive the switching transistor according to the pulse signal.

13. The control circuit according to claim 12, wherein the DC/DC converter may be a boost type that boosts an input voltage $V_{IN}$ and generates an output voltage $V_{OUT}$.

14. The control circuit according to claim 13, wherein the ON time is proportional to $(V_{OUT}-V_{IN})/V_{OUT}$.

15. The control circuit according to claim 12, wherein the control circuit is integrally integrated on one semiconductor substrate.

16. A power supply circuit comprising:
- an output circuit of a DC/DC converter; and
- the control circuit according to claim 12.

17. A control method for a DC/DC converter including a switching transistor, the method comprising:
- comparing a feedback voltage corresponding to an output voltage of the DC/DC converter with a reference voltage, and asserting a turn-on signal when the feedback voltage falls below the reference voltage;
- asserting the turn-off signal after an ON time elapses from turn-on of the switching transistor;
- asserting an overcurrent detection signal when a voltage flowing through the switching transistor exceeds an overcurrent threshold value in an ON period of the switching transistor;
- asserting a turn-on inhibition signal in a period from the turn-on of the switching transistor until elapse of a predetermined time;
- transitioning a pulse signal to an ON level when a turn-on signal is asserted in a period in which the turn-on inhibition signal is negated;
- transitioning the pulse signal to an OFF level when a turn-off signal or the overcurrent detection signal is asserted; and
- driving the switching transistor corresponding to the pulse signals.

* * * * *